US012772157B2

(12) United States Patent
Ianev et al.

(10) Patent No.: US 12,772,157 B2
(45) Date of Patent: Oct. 20, 2026

(54) METHOD FOR NETWORK NODE AND NETWORK NODE

(71) Applicant: NEC Corporation, Tokyo (JP)

(72) Inventors: Iskren Ianev, Tokyo (JP); Toshiyuki Tamura, Tokyo (JP); Kundan Tiwari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 356 days.

(21) Appl. No.: 18/445,769

(22) PCT Filed: Jun. 1, 2022

(86) PCT No.: PCT/JP2022/022372
§ 371 (c)(1),
(2) Date: Dec. 22, 2023

(87) PCT Pub. No.: WO2022/270259
PCT Pub. Date: Dec. 29, 2022

(65) Prior Publication Data
US 2024/0259932 A1 Aug. 1, 2024

(30) Foreign Application Priority Data
Jun. 25, 2021 (IN) ............................. 202111028662

(51) Int. Cl.
*H04W 48/18* (2009.01)
*H04W 36/00* (2009.01)
*H04W 36/14* (2009.01)
*H04W 48/16* (2009.01)

(52) U.S. Cl.
CPC ....... *H04W 48/18* (2013.01); *H04W 36/0022* (2013.01); *H04W 36/13* (2023.05); *H04W 36/144* (2023.05); *H04W 48/16* (2013.01)

(58) Field of Classification Search
CPC . H04W 48/18; H04W 36/0022; H04W 36/13; H04W 36/144; H04W 48/16; H04W 24/02
See application file for complete search history.

(56) References Cited

U.S. PATENT DOCUMENTS

| | | | | |
|---|---|---|---|---|
| 12,526,116 B2 * | 1/2026 | Tamura | ................. | H04L 5/0055 |
| 2018/0376384 A1 * | 12/2018 | Youn | ................... | H04W 36/144 |
| 2020/0245127 A1 * | 7/2020 | Zong | ................. | H04W 36/0066 |
| 2020/0260340 A1 * | 8/2020 | Jing | ...................... | H04W 76/10 |
| 2020/0314701 A1 * | 10/2020 | Talebi Fard | .......... | H04W 36/08 |

(Continued)

OTHER PUBLICATIONS

International Search Report for PCT Application No. PCT/JP2022/022372, mailed on Aug. 30, 2022.

(Continued)

*Primary Examiner* — Kenneth T Lam
(74) *Attorney, Agent, or Firm* — Sughrue Mion, PLLC

(57) ABSTRACT

A method of a Session Management Function (SMF) apparatus includes communicating with a Network Slice Admission Control Function (NSACF) apparatus and sending a message to the NSACF apparatus for a Network Slice Admission Control (NSAC). The message includes information related to a handover from Evolved Packet System (EPS) to $5^{th}$ Generation System (5GS) and information indicating the NSACT is not supported in the EPS.

6 Claims, 19 Drawing Sheets

(56) References Cited

U.S. PATENT DOCUMENTS

| | | | | |
|---|---|---|---|---|
| 2022/0361093 | A1* | 11/2022 | Kiss | H04W 48/16 |
| 2024/0137277 | A1* | 4/2024 | Venkataraman | H04L 41/082 |
| 2024/0137889 | A1* | 4/2024 | Velev | H04W 60/00 |
| 2024/0147235 | A1* | 5/2024 | Velev | H04L 63/10 |
| 2024/0259979 | A1* | 8/2024 | Merino Vazquez | H04W 48/18 |

OTHER PUBLICATIONS

English translation of Written opinion for PCT Application No. PCT/JP2022/022372, mailed on Aug. 30, 2022.

3GPP TR 21.905: "Vocabulary for 3GPP Specifications". V17.0.0 (Jul. 2020).

3GPP TS 23.501: "System architecture for the 5G System (5GS)". V17.0.0 (Mar. 2021).

3GPP TS 23.502: "Procedures for the 5G System (5GS)". V17.0.0 (Mar. 2021).

3GPP TS 23.700-40: "Study on enhancement of network slicing". V17.0.0 (Mar. 2021).

Generic Network Slice Template, https://www.gsma.com/newsroom/wp-content/uploads/NG.116-v2.0.pdf.

ENS_Ph2 exceptions sheet submitted to SAP#92E, http://ftp.3gpp.org/tsg_sa/TSG_SA/TSGs_92E_Electronic_2021_06/Docs/SP-210316.zip.

Samsung, Apple, LG Electronics, China Mobile, Nokia, Nokia Shanghai Bell, Ericsson, NTT DOCOMO, ZTE, Network Slice Admission Control in EPC, 3GPP TSG SA WG2 #145E S2-2104408, May 10, 2021, 5.15.11.X Support of Network Slice Admission Control and Interworking with EPC.

Lenovo, Motorola Mobility, NSACF update in case of inter-AMF mobility with no UE context transfer, 3GPP TSG SA WG2 #145E S2-2104648, May 10, 2021, 4.2.11.2 Number of UEs per network slice availability check and update procedure.

* cited by examiner

Fig.4

| RAT type |
|---|
| Non-3GPP |
| EUTRAN via EPS |
| EUTRAN as 2ndary RAT via EPS |
| EUTRAN as 2ndary RAT via 5GS |
| EUTRAN via 5GS |
| EUTRAN-NB-IoT |
| NR |
| NR as 2ndary RAT |

System overview of (R)AN node 5 based on ORAN architecture

METHOD FOR NETWORK NODE AND NETWORK NODE

This application is a National Stage Entry of PCT/JP2022/022372 filed on Jun. 1, 2022, which claims priority from Indian Patent Application number 202111028662 filed on Jun. 25, 2021, the contents of all of which are incorporated herein by reference, in their entirety.

TECHNICAL FIELD

The present disclosure relates to a method of a Session Management Function (SMF) apparatus, a method of a Network Slice Admission Control Function (NSACF) apparatus, a method of an Access and Mobility Management Function (AMF) apparatus, a method of an apparatus related to SMF, a SMF apparatus, a NSACF apparatus, an AMF apparatus and an apparatus related to SMF.

BACKGROUND ART

Network slicing feature was defined in the 3GPP release 15 and release 16 specifications. GSMA 5GJA has introduced in NPL 5 the concept of Generic network Slice Template (GST) from which several Network Slice Types descriptions can be derived. Some of these parameters in the GST point explicitly to the definition of parameters and bounds on the service delivered to the end customer. For instance, the GST aims at the limitation of the number of PDU sessions per network slice, or the number of devices supported per network slice, or the maximum UL or DL data rate per network slice. NPL 4 identified and addressed the gaps that needed to be filled in providing support for the GST parameters enforcement and the suitable solutions to address these gaps.

CITATION LIST

Non Patent Literature

[NPL 1] 3GPP TR 21.905: "Vocabulary for 3GPP Specifications". V17.0.0 (2020-07)
[NPL 2] 3GPP TS 23.501: "System architecture for the 5G System (5GS)". V17.0.0 (2021-03)
[NPL 3] 3GPP TS 23.502: "Procedures for the 5G System (5GS)". V17.0.0 (2021-03)
[NPL 4] 3GPP TS 23.700-40: "Study on enhancement of network slicing". V17.0.0 (2021-03)
[NPL 5] Generic Network Slice Template https://www.gsma.com/newsroom/wp-content/uploads/NG.116-v2.0.pdf
[NPL 6] eNS_Ph2 exceptions sheet submitted to SAP #92E ftp://ftp.3gpp.org/tsg_sa/TSG_SA/TSGs_92E_Electronic_2021_06/Docs/SP-210316.zip

SUMMARY OF INVENTION

Technical Problem

However, there are still outstanding issues related to EPS and 5GS interworking and mobility.

Solution to Problem

In an aspect of the present disclosure, a method of a Session Management Function (SMF) apparatus includes communicating with a Network Slice Admission Control Function (NSACF) apparatus and sending a message to the NSACF apparatus for a Network Slice Admission Control (NSAC). The message includes information related to a handover from Evolved Packet System (EPS) to 5th Generation System (5GS) and information indicating the NSAC is not supported in the EPS.

In an aspect of the present disclosure, a method of a Network Slice Admission Control Function (NSACF) apparatus includes receiving a message from a Session Management Function (SMF) apparatus. The message includes first information related to a handover from Evolved Packet System (EPS) to 5th Generation System (5GS) and second information indicating a Network Slice Admission Control Function (NSAC) is not supported in the EPS. The method includes accepting a PDU Session related to the handover in a case where the number of PDU Sessions on the 5GS reaches to a predetermined threshold value and the message includes the first information and the second information.

In an aspect of the present disclosure, a method of an Access and Mobility Management Function (AMF) apparatus includes communicating with a Network Slice Admission Control Function (NSACF) apparatus and sending a message to the NSACF apparatus for a Network Slice Admission Control (NSAC). The message includes information related to a handover from Evolved Packet System (EPS) to 5th Generation System (5GS) and information indicating the NSAC is not supported in the EPS.

In an aspect of the present disclosure, a method of a Network Slice Admission Control Function (NSACF) apparatus includes receiving a message from an Access and Mobility Management Function (AMF) apparatus. The message includes first information related to a handover from Evolved Packet System (EPS) to 5th Generation System (5GS) and second information indicating a Network Slice Admission Control Function (NSAC) is not supported in the EPS. The method includes accepting a registration of a User Equipment (UE) related to the handover in a case where the number of UEs registered on 5GS reaches to a predetermined threshold value and the message includes the first information and the second information.

In an aspect of the present disclosure, a method of an apparatus related to Session Management Function (SMF) includes communicating with a Network Slice Admission Control Function (NSACF) apparatus and sending a message to the NSACF apparatus for a Network Slice Admission Control (NSAC). The message includes information related to Radio Access Technology (RAT) of a User Equipment (UE).

In an aspect of the present disclosure, a method of a Session Management Function (SMF) apparatus includes communicating with a Network Slice Admission Control Function (NSACF) apparatus and sending a message to the NSACF apparatus for a Network Slice Admission Control (NSAC). The message includes information related to Radio Access Technology (RAT) of a User Equipment (UE). The RAT is a target RAT for a handover of the UE.

In an aspect of the present disclosure, a method of a Network Slice Admission Control Function (NSACF) apparatus includes receiving a first message from an apparatus related to Session Management Function (SMF). The first message includes information related to first Radio Access Technology (RAT) of a User Equipment (UE). The method includes receiving a second message from an Access and Mobility Management Function (AMF) apparatus. The second message includes second information related to second RAT of the UE. The second RAT is a target RAT for a handover of the UE. The method includes accepting a PDU Session related to the handover in a case where the number of PDU Sessions on the second RAT reaches to a predetermined threshold value and the first RAT is mapped to the second RAT.

In an aspect of the present disclosure, a method of an Access and Mobility Management Function (AMF) apparatus includes communicating with a Network Slice Admission Control Function (NSACF) apparatus and sending a message to the NSACF apparatus for a Network Slice Admission Control (NSAC). The message includes information related to Radio Access Technology (RAT) of a User Equipment (UE). The RAT is a target RAT for a handover of the UE.

In an aspect of the present disclosure, a method of a Network Slice Admission Control Function (NSACF) apparatus includes receiving a first message from an apparatus related to Session Management Function ((SMF). The first message includes information related to first Radio Access Technology (RAT) of a User Equipment (UE). The method includes receiving a second message from an Access and Mobility Management Function (AMF) apparatus. The second message includes second information related to second RAT of the UE. The second RAT is a target RAT for a handover of the UE. The method includes accepting a PDU Session related to the handover in a case where the number of UEs on the second RAT reaches to a predetermined threshold value and the first RAT is mapped to the second RAT.

In an aspect of the present disclosure, a Session Management Function (SMF) apparatus includes means for communicating with a Network Slice Admission Control Function (NSACF) apparatus and means for sending a message to the NSACF apparatus for a Network Slice Admission Control (NSAC). The message includes information related to a handover from Evolved Packet System (EPS) to 5th Generation System (5GS) and information indicating the NSAC is not supported in the EPS.

In an aspect of the present disclosure, a Network Slice Admission Control Function (NSACF) apparatus includes means for receiving a message from a Session Management Function (SMF) apparatus. The message includes first information related to a handover from Evolved Packet System (EPS) to 5th Generation System (5GS) and second information indicating a Network Slice Admission Control Function (NSAC) is not supported in the EPS and means for accepting a PDU Session related to the handover in a case where the number of PDU Sessions on the 5GS reaches to a predetermined threshold value and the message includes the first information and the second information.

In an aspect of the present disclosure, an Access and Mobility Management Function (AMF) apparatus includes means for communicating with a Network Slice Admission Control Function (NSACF) apparatus and means for sending a message to the NSACF apparatus for a Network Slice Admission Control (NSAC). The message includes information related to a handover from Evolved Packet System (EPS) to 5th Generation System (5GS) and information indicating the NSAC is not supported in the EPS.

In an aspect of the present disclosure, a Network Slice Admission Control Function (NSACF) apparatus includes means for receiving a message from an Access and Mobility Management Function (AMF) apparatus. The message includes first information related to a handover from Evolved Packet System (EPS) to 5th Generation System (5GS) and second information indicating a Network Slice Admission Control Function (NSAC) is not supported in the EPS. The NSACF apparatus includes means for accepting a registration of a User Equipment (UE) related to the handover in a case where the number of UEs registered on 5GS reaches to a predetermined threshold value and the message includes the first information and the second information.

In an aspect of the present disclosure, an apparatus related to Session Management Function (SMF) includes means for communicating with a Network Slice Admission Control Function (NSACF) apparatus and means for sending a message to the NSACF apparatus for a Network Slice Admission Control (NSAC). The message includes information related to Radio Access Technology (RAT) of a User Equipment (UE).

In an aspect of the present disclosure, a Session Management Function (SMF) apparatus includes means for communicating with a Network Slice Admission Control Function (NSACF) apparatus and means for sending a message to the NSACF apparatus for a Network Slice Admission Control (NSAC). The message includes information related to Radio Access Technology (RAT) of a User Equipment (UE). The RAT is a target RAT for a handover of the UE.

In an aspect of the present disclosure, a Network Slice Admission Control Function (NSACF) apparatus includes means for receiving a first message from an apparatus related to Session Management Function (SMF). The first message includes information related to first Radio Access Technology (RAT) of a User Equipment (UE). The NSACF apparatus includes means for receiving a second message from an Access and Mobility Management Function (AMF) apparatus. The second message includes second information related to second RAT of the UE. The second RAT is a target RAT for a handover of the UE. The NSACF apparatus includes means for accepting a PDU Session related to the handover in a case where the number of PDU Sessions on the second RAT reaches to a predetermined threshold value and the first RAT is mapped to the second RAT.

In an aspect of the present disclosure, an Access and Mobility Management Function (AMF) apparatus includes means for communicating with a Network Slice Admission Control Function (NSACF) apparatus and means for sending a message to the NSACF apparatus for a Network Slice Admission Control (NSAC). The message includes information related to Radio Access Technology (RAT) of a User Equipment (UE). The RAT is a target RAT for a handover of the UE.

In an aspect of the present disclosure, a Network Slice Admission Control Function (NSACF) apparatus includes means for receiving a first message from an apparatus related to Session Management Function (SMF). The first message includes information related to first Radio Access Technology (RAT) of a User Equipment (UE). The NSACF apparatus includes means for receiving a second message from an Access and Mobility Management Function (AMF) apparatus. The second message includes second information related to second RAT of the UE. The second RAT is a target RAT for a handover of the UE. The NSACH apparatus includes means for accepting a PDU Session related to the handover in a case where the number of UEs on the second RAT reaches to a predetermined threshold value and the first RAT is mapped to the second RAT.

In an aspect of the present disclosure, a method of a first apparatus includes communicating with a second apparatus, sending, to the second apparatus and a first parameter indicating that a communication apparatus is changing communication system from a first communication system to a second communication system and a second parameter indicating that network slice control is supported or not supported.

In an aspect of the present disclosure, a method of a second apparatus includes, receiving, from a first apparatus, a first parameter indicating that a communication apparatus is changing communication system from a first communication system to a second communication system and a second parameter indicating that network slice control is supported or not supported; and accepting a Protocol Data Unit (PDU) session(s) in a case where the second apparatus receives the first parameter and the second parameter.

In an aspect of the present disclosure, a method of a third apparatus includes communicating with a second apparatus and sending, to the second apparatus, a first parameter indicating that a communication apparatus is changing communication system from a first communication system to a second communication system and a second parameter indicating that network slice control is supported or not or not supported.

In an aspect of the present disclosure, a method of a second apparatus includes receiving, from a first apparatus, a first parameter indicating that a communication apparatus is changing communication system from a first communication system to a second communication system and a second parameter indicating that network slice control is supported or not supported and accepting a communication apparatus registration in a case where the second apparatus receives the first parameter and the second parameter.

In an aspect of the present disclosure, a method of a second apparatus includes receiving, from a first system, a third parameter indicating a first Radio Access Technology (RAT) type, receiving, from a third apparatus, a fourth parameter indicating a second RAT type and accepting Protocol Data Unit (PDU) session in a case where the second apparatus receives the third parameter and the fourth parameter.

In an aspect of the present disclosure, a method of a second apparatus includes receiving, from a first system, a third parameter indicating a first Radio Access Technology (RAT) type, receiving, from a third apparatus, a fourth parameter indicating a second RAT type and accepting a communication apparatus registration in a case where the second apparatus receives the third parameter and the fourth parameter.

BRIEF DESCRIPTION OF DRAWINGS

FIG. 4 illustrates RAT type example for the Network Slice Admission Control.

DESCRIPTION OF EMBODIMENTS

Each of aspects and elements included in the each aspects described below may be implemented independently or in combination with any other. These aspects include novel characteristics different from one another. Accordingly, these aspects contribute to achieving objects or solving problems different from one another and contribute to obtaining advantages different from one another.

The 3GPP SA2 Working Group will continue addressing these open issues within the Rel-17 standardization work as planned in NPL 6.

One of the outstanding problems is how to control the number of UEs registered with a network slice and the number of the PDU Sessions established on a network slice in the case of EPS and 5GS interworking and mobility. In NPL 6 the SA2 noted its intention to 'finalize the support for EPC interworking' during the 3GPP Rel-17 standardization work.

Figure 1:
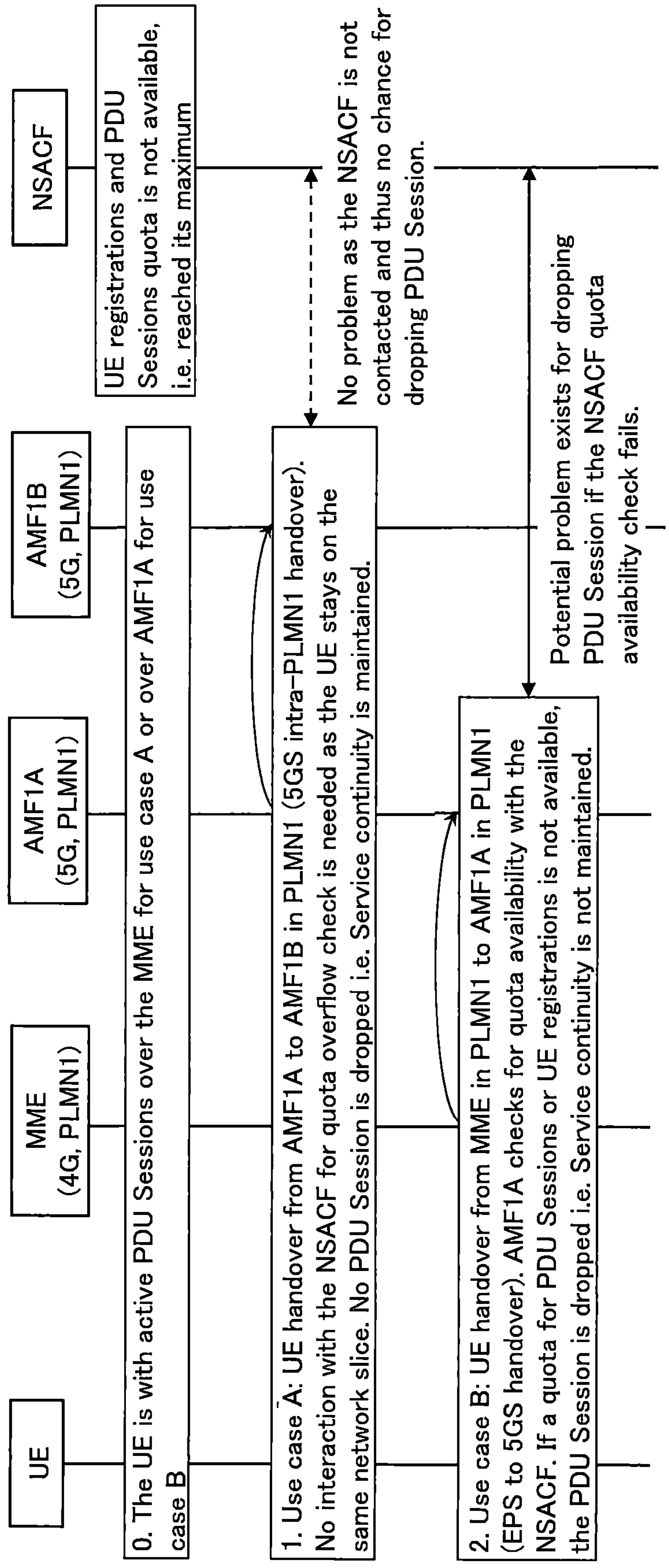
FIG. 1 illustrates Service continuity use cases.

FIG. 1 below demonstrates the difference between the UE mobility within the 5GS and the UE mobility between the EPS and 5GS in terms of the number of the UE registrations per network slice and the number of the PDU Sessions on a network slice control and enforcement.

0. At starting point the UE is in connected mode, either with a PDN connection in EPS or with an active PDU Session in 5GS.

1. Use case A: UE handover within 5GS (e.g. from AMF1A to AMF1B in PLMN1, i.e. 5GS intra PLMN1 handover). No interaction with the NSACF (Network Slice Admission Control Function) for the number of UEs per network slice or for the number of PDU Sessions per network slice is needed if the UE stays on the same network slice. In this case the UE stays registered with the network slice on which it was before the handover and the UE maintains the PDU Session active after the handover regardless whether the number of the registered UEs or the number of established PDU Sessions on the network slice has reached its maximum or not. No PDU Session is dropped i.e. the service continuity in the 5GS internal mobility is maintained.

2. Use case B: UE handover from EPS (MME) to 5GS (AMF1A). If the NSAC (Network Slice Admission Control) i.e. the number of UEs per network slice or the number of PDU Sessions per network slice control is not supported in the EPS (i.e. 4G), which is a valid deployment option, and if the number of the registered UEs with the network slice or the number of the established PDU Sessions with the network slice in the 5GS has reached its maximum, the UE may lose its registration status if the number of the UEs registered with the network slice in 5GS has reached its maximum or the UE may drop the PDU Session if the number of the PDU Sessions established on the network slice has reached its maximum. In this case the service continuity in EPS to 5GS intersystem change may not be maintained. That is why the use case B is a problem.

This disclosure and aspects in the disclosure relate to Network Slice Admission Control in EPS to 5GS intersystem change or EPS to 5GS handover.

Abbreviations

For the purposes of the present document, the abbreviations given in NPL 1 and the following apply. An abbreviation defined in the present document takes precedence over the definition of the same abbreviation, if any, in NPL 1.

3GPP 3rd Generation Partnership Project
4G-GUTI 4G Globally Unique Temporary UE Identity
5G 5th Generation
5GC 5G Core Network
5GLAN 5G Local Area Network
5GS 5G System
5G-AN 5G Access Network
5G-AN PDB 5G Access Network Packet Delay Budget
5G-EIR 5G-Equipment Identity Register
5G-GUTI 5G Globally Unique Temporary Identifier
5G-BRG 5G Broadband Residential Gateway
5G-CRG 5G Cable Residential Gateway
5G GM 5G Grand Master
5G-RG 5G Residential Gateway
5G-S-TMSI 5G S-Temporary Mobile Subscription Identifier
5G VN 5G Virtual Network
5QI 5G QOS Identifier
ABBA Anti-Bidding-down Between Architectures
AF Application Function
AMF Access and Mobility Management Function
API Application Programming Interface
AS Access Stratum
ATSSS Access Traffic Steering, Switching, Splitting
ATSSS-LL ATSSS Low-Layer
AUSF Authentication Server Function
AUTN Authentication token
BBF Broadband Forum
BCCH Broadcast Control Channel
BMCA Best Master Clock Algorithm
BSF Binding Support Function
CAG Closed Access Group
CAPIF Common API Framework for 3GPP northbound APIs
CHF Charging Function
CN PDB Core Network Packet Delay Budget
CP Control Plane
CU Centralized Unit
DAPS Dual Active Protocol Stacks
DCN Dedicated Core Network
DL Downlink
DN Data Network
DNAI DN Access Identifier
DNN Data Network Name
DRX Discontinuous Reception
DS-TT Device-side TSN translator
DU Distributed Unit
ePDG evolved Packet Data Gateway
EAP Extensible Authentication Protocol
EBI EPS Bearer Identity
EPS Evolved Packet System
EUI Extended Unique Identifier
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLC Gateway Mobile Location Centre
GPSI Generic Public Subscription Identifier
GSMA Global System for Mobile Communications
GST Generic Network Slice Template
GUAMI Globally Unique AMF Identifier
GUTI Globally Unique Temporary UE Identity
HR Home Routed (roaming)
IAB Integrated access and backhaul
IMEI/TAC IMEI Type Allocation Code
IMS IP Multimedia Subsystem
IPUPS Inter PLMN UP Security
I-SMF Intermediate SMF
I-UPF Intermediate UPF
LADN Local Area Data Network
LBO Local Break Out (roaming)
LMF Location Management Function
LoA Level of Automation
LPP LTE Positioning Protocol
LRF Location Retrieval Function
LTE Long Term Evolution
MAC Medium Access Control
MCC Mobile country code
MCX Mission Critical Service
MDBV Maximum Data Burst Volume
MFBR Maximum Flow Bit Rate
MICO Mobile Initiated Connection Only
MITM Man In The Middle
MM Mobility Management
MNC Mobile Network Code
MNO Mobile Network Operator
MPS Multimedia Priority Service
MPTCP Multi-Path TCP Protocol
MT Mobile Terminated
MT Mobile Termination
N3IWF Non-3GPP Inter Working Function
N5CW Non-5G-Capable over WLAN
NAI Network Access Identifier
NAS Non-Access Stratum
NEF Network Exposure Function
NF Network Function
NGAP Next Generation Application Protocol
ngKSI Next Generation Key Set Identifier
NG-RAN Next Generation Radio Access Network
NID Network identifier
NPN Non-Public Network
NR New Radio
NRF Network Repository Function
NSAC Network Slice Admission Control
NSACF
Network Slice Admission Control Function
NSI ID Network Slice Instance Identifier
NSSAA Network Slice-Specific Authentication and Authorization
NSSAAF Network Slice-Specific Authentication and Authorization Function
NSSAI Network Slice Selection Assistance Information
NSSF Network Slice Selection Function
NSSP Network Slice Selection Policy
NSSRG Network Slice Simultaneous Registration Group
NW-TT Network-side TSN translator
NWDAF Network Data Analytics Function
O-RAN Open RAN Alliance
O-DU O-RAN Distributed Unit
O-CU O-RAN Centralized Unit
O-RU O-RAN Radio Unit
PCC Policy and Charging Control PCF Policy Control Function
PDB Packet Delay Budget
PDCP Packet Data Convergence Protocol
PDR Packet Detection Rule
PDU Protocol Data Unit
PEI Permanent Equipment Identifier
PER Packet Error Rate
PFD Packet Flow Description
PLMN Public Land Mobile Network
PNI-NPN Public Network Integrated Non-Public Network
PPD Paging Policy Differentiation
PPF Paging Proceed Flag
PPI Paging Policy Indicator
PSA PDU Session Anchor
PTP Precision Time Protocol
QFI QoS Flow Identifier
QoE Quality of Experience
Qos Quality of Service
RACS Radio Capabilities Signalling optimisation
(R)AN (Radio) Access Network
RG Residential Gateway
RIM Remote Interference Management
RLC Radio Link Control
RQA Reflective QoS Attribute
RQI Reflective QoS Indication
RRC Radio Resource Control
RSN Redundancy Sequence Number
SA NR Standalone New Radio
SBA Service Based Architecture
SBI Service Based Interface
SCP Service Communication Proxy
SD Slice Differentiator
SDAP Service Data Adaptation Protocol
SEAF Security Anchor Functionality
SEPP Security Edge Protection Proxy
SMF Session Management Function
SMSF Short Message Service Function
SN Sequence Number
SN name Serving Network Name.
SNPN Stand-alone Non-Public Network
S-NSSAI Single Network Slice Selection Assistance Information
SOR Steering Of Roaming
SSC Session and Service Continuity
SSCMSP Session and Service Continuity Mode Selection Policy
SST Slice/Service Type
SUCI Subscription Concealed Identifier
SUPI Subscription Permanent Identifier
SV Software Version
TAI Tracking Area Identity
TCP Transmission Control Protocol
TMSI Temporary Mobile Subscriber Identity
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSCAI TSC Assistance Information
TSN Time Sensitive Networking
TSN GM TSN Grand Master
TSP Traffic Steering Policy
TT TSN Translator
TWIF Trusted WLAN Interworking Function
UCMF UE radio Capability Management Function
UDM Unified Data Management
UDR Unified Data Repository
UDSF Unstructured Data Storage Function
UE User Equipment
UL Uplink
UL CL Uplink Classifier
UP User Plane
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
VPLMN Visited PLMN
W-5GAN Wireline 5G Access Network
W-5GBAN Wireline BBF Access Network
W-5GCAN Wireline 5G Cable Access Network
W-AGF Wireline Access Gateway Function
WLAN Wireless Local Area Network
WUS Wake Up Signal Definitions For the purposes of the present document, the terms and definitions given in NPL 1 and the following apply. A term defined in the present document takes precedence over the definition of the same term, if any, in NPL 1.

General

Those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the Aspects of the present disclosure so as not to obscure the figures with details that will be readily apparent to those skilled in the art having the benefit of the description herein.

For the purpose of promoting an understanding of the principles of the disclosure, reference will now be made to the Aspect illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or entities or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an Aspect", "in another Aspect" and similar language throughout this specification may, but not necessarily do, all refer to the same Aspect.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

As used herein, information is associated with data and knowledge, as data is meaningful information and represents the values attributed to parameters. Further knowledge signifies understanding of an abstract or concrete concept. Note that this example system is simplified to facilitate description of the disclosed subject matter and is not intended to limit the scope of this disclosure. Other devices, systems, and configurations may be used to implement the Aspects disclosed herein in addition to, or instead of, a system, and all such Aspects are contemplated as within the scope of the present disclosure.

<Aspect 1: Network Slice Admission Control in EPS to 5GS Handover>

Figure 2:
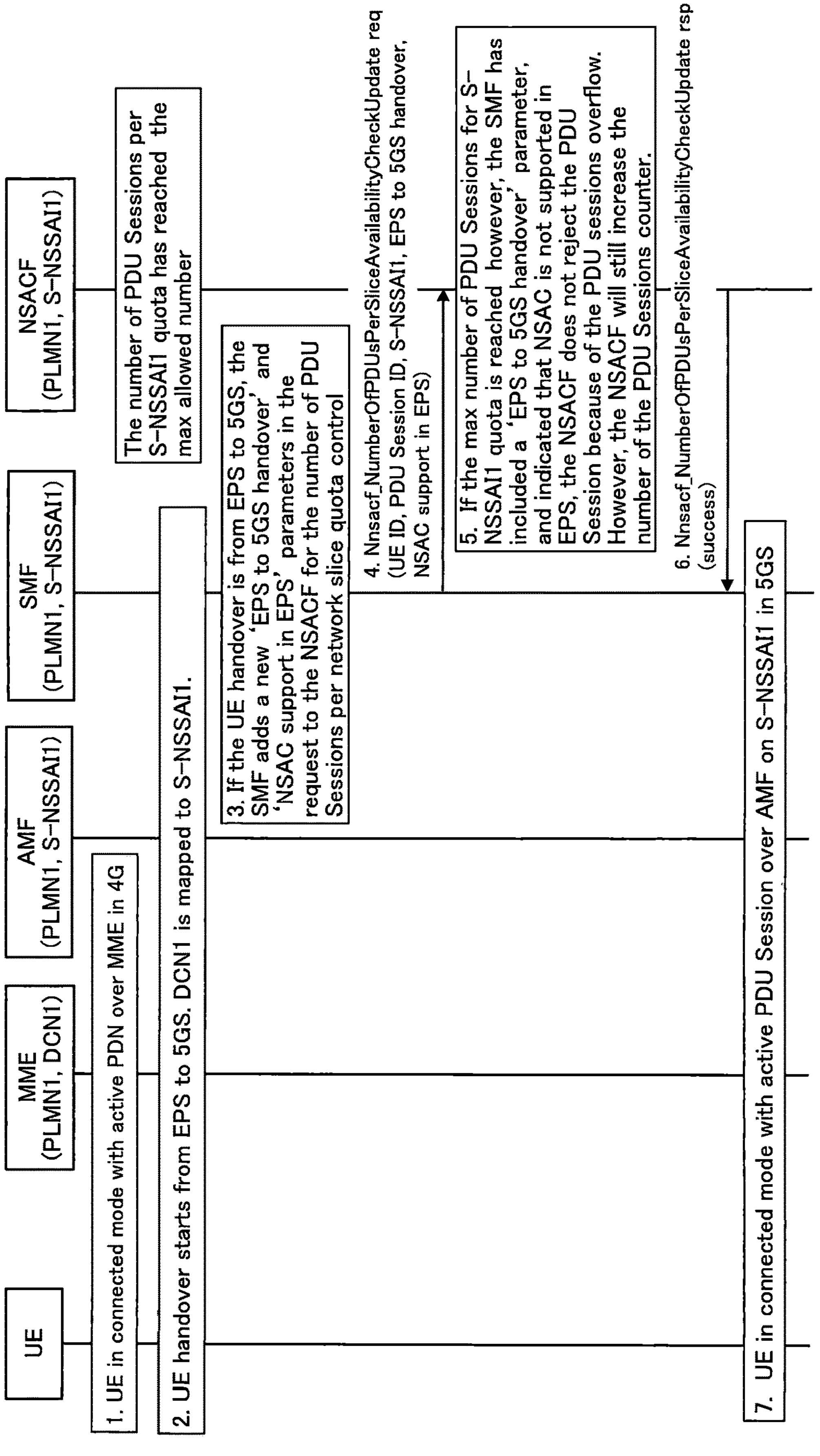
FIG. 2 illustrates Network Slice Admission Control in EPS to 5GS handover in Aspect 1A.

Aspect 1A: Number of PDU Sessions control in EPS to 5GS handover—The Aspect 1A is a solution for the service continuity problem described in Use Case B in FIG. 1 where the UE drops an active PDU Session(s) at EPS to 5GS handover due to NSAC (Network Slice Admission Control) of the numbers of the PDU Sessions per network slice overflow in the 5GS. This solution, demonstrated in FIG. 2, allows the UE to maintain service continuity at EPS to 5GS handover. For example, the UE is in connected mode in EPS with active PDN connection on DCN1. The UE handovers from EPS to 5GS where DCN1 is mapped to network slice S-NSSAI1. The SMF triggers NSAC (Network Slice Admission Control) for the number of the PDU Sessions established on a network slice quota control procedure as defined in NPL 3. As the UE intersystem change is a handover from EPS to 5GS, the SMF includes a new 'EPS to 5GS handover' parameter and a new 'NSAC support in EPS' parameter in the Nnsacf_NumberOfPDUsPerSliceAvailabilityCheckUpdate request message, and the SMF sends the Nnsacf_NumberOfPDUsPerSliceAvailabilityCheckUpdate request message to the NSACF. If 'EPS to 5GS handover' parameter is included and if the 'NSACF support' parameter indicates that the NSAC is not supported in the EPS, the NSACF does not reject (or the NSACF accepts) the PDU Session even if the quota (i.e. the maximum number of the PDU Sessions or the maximum allowed number of the PDU Sessions) for the network slice S-NSSAI1 has been reached.

In this Aspect, the NSACF manages the number of PDU Sessions per network slices. For example, the NSACF may manage the number of PDU Sessions of a network slice indicated by the S-NSSAI1. The number of PDU Sessions of a network slice indicated by the S-NSSAI1 may be called as the number of PDU Sessions per S-NSSAI1. In this Aspect, the number of the number of PDU Sessions per S-NSSAI1 has reached a predetermined number (e.g. a threshold of the number of PDU Sessions per S-NSSAI1, or the maximum number of PDU Sessions per S-NSSAI1).

Note that, the number of PDU Sessions per S-NSSAI1 may reach the maximum number of PDU Sessions per S-NSSAI1 at one timing, but the number of PDU Sessions per S-NSSAI1 may not reach the maximum number after the one timing due to release of the PDU Sessions.

In addition, the maximum number of PDU Sessions per S-NSSAI1 may be configured considering a margin. For example, the network (e.g. the NSACF) may accept a new PDU session even if the maximum number of PDU Sessions per S-NSSAI1 has reached.

1. The UE is in connected mode with active PDN connection(s) or PDU connection(s) over the MME in EPS (i.e. 4G).

2. At some stage a handover from EPS to 5GS procedure is triggered as per NPL 3, clause 4.11.1.2. During the EPS to 5GS handover the DCN (Dedicated Core Network) on which the UE has an active PDN connection is mapped to a network slice in 5GS, for example DCN1 is mapped to S-NSSAI1.

3. If the UE handover is from EPS to 5GS, an SMF adds, to an Nnsacf_NumberOfPDUsPerSlice Availability Check-Update request message, 'EPS to 5GS handover' parameter (or any other notation for a parameter to indicate that the UE is undergoing an EPS to 5GS intersystem change or information indicating that the UE is undergoing an EPS to 5GS intersystem change, or information indicating that the UE is undergoing an EPS to 5GS handover) when interacting with the NSACF for the number of the PDU Sessions per network slice admission control for S-NSSAI 1, i.e. the number of PDU Sessions per network slice quota control.

The SMF may also include, in the Nnsacf_NumberOfPDUsPerSliceAvailabilityCheckUpdate request message, the 'NSAC support in EPS' parameter (or any other notation for a parameter with the purpose to indicate to the NSACF whether NSAC, i.e. quota control in EPS is supported or not).

The 'NSAC support in EPS' parameter may be called as information indicating whether NSAC, i.e. quota control in EPS is supported or not.

For example, the SMF may determine that the UE handover is from EPS to 5GS based on information from the AMF during the handover procedure.

For example, the SMF may determine whether NSAC, i.e. quota control in EPS is supported or not based on information from the AMF during the handover procedure.

4. The SMF sends the Nnsacf_NumberOfPDUsPerSliceAvailabilityCheckUpdate request message to the NSACF. The Nnsacf_NumberOfPDUsPerSlice Availability-CheckUpdate request message includes UE ID (or identifier of the UE), PDU Session ID (or identifier of the PDU Session), S-NSSAI1, the 'EPS to 5GS handover' parameter, and the 'NSAC support in EPS' parameter. The Nnsacf_NumberOfPDUsPerSlice Availability CheckUpdate request message may be called as Nnsacf_NumberOfPDUsPerSliceAvailabilityCheckUpdate request. The Nnsacf_NumberOfPDUsPerSlice Availability CheckUpdate request message may be called as Nnsacf_NumberOfPDUsPerSlice Availability CheckUpdate req.

If the UE is coming from EPS e.g. handover from EPS to 5GS, the SMF includes the 'EPS to 5GS handover' parameter in the Nnsacf_NumberOfPDUsPerSliceAvailabilityCheckUpdate request. If the NSAC, i.e. quota control is not supported in the EPS, the SMF also includes, in the Nnsacf_NumberOfPDUsPerSliceAvailabilityCheckUpdate request, the 'NSAC support in EPS' parameter which indicates that the NSAC, i.e. quota control is not supported in the EPS.

5. If the maximum number of the PDU Sessions for a network slice (e.g. S-NSSAI1) is reached however, the SMF has included the 'EPS to handover' 5GS parameter in the Nnsacf_NumberOfPDUsPerSliceAvailabilityCheckUpdate request, and the SMF indicated in the 'NSAC support in EPS' parameter that NSAC i.e. quota control is not supported in the EPS, the NSACF does not reject (or the NSACF accepts) the PDU Session(s) if the maximum number of the PDU Sessions on the network slice (e.g. S-NSSAI1) has been reached. This is to the contrary of the NSACF behaviour when the UE is moving via handover within the 5GS. This differentiated NSACF behaviour for the EPS to 5GS intersystem change (or the EPS to 5GS handover or mobility from EPS to 5GS) allows for service continuity in mobility from EPS to 5GS even if the maximum number of the PDU Sessions on the network slice has been reached.

However, the NSACF will still increase the number of the PDU Sessions counter for the network slice and the NSACF will also add the UE ID and PDU Session ID into the list of UEs and PDU Sessions maintained in the NSACF for that network slice. In addition, when the NSACF determines whether the PDU Session is rejected or not, the NSACF also determines whether DCN 1 is mapped to S-NSSAI 1. That is, the NSACF determines that DCN of handover source (i.e. 4G or EPS) corresponds to (or mapped to) S-NSSAI of handover target (i.e. 5G or 5GS).

In addition, when the NSACF determines whether to reject the PDU Session or not, the NSACF may also determine whether DCN 1 is mapped to S-NSSAI 1 (or whether E-UTRAN via EPS related to the DCN 1 is mapped to NR related to S-NSSAI 1).

For example, the NSACF may determine that DCN of handover source (i.e. 4G or EPS) corresponds to (or mapped to) S-NSSAI of handover target (i.e. 5G or 5GS) and may determine that the message includes the 'EPS to 5GS handover' parameter and the 'NSAC support in EPS' parameter indicating that NSAC i.e. quota control is not supported in the EPS, then the NSACF may determine not to reject the PDU Session. In other aspects, the NSACF may determine whether to reject the PDU Session or not in the same manner as mentioned above.

In one example, the NSACF may reject the PDU Session(s) if the maximum number of the PDU Sessions quota on the network slice (e.g. S-NSSAI1) has been reached and the number of established PDU sessions(s) has exceeded significantly the maximum allowed number of PDU Sessions (e.g. exceeded the allowed exception quota overflow number set up by configuration or operator policy in the NSACF).

In one example, the NSACF may reject the PDU Session(s) if the maximum number of the PDU Sessions on the network slice (e.g. S-NSSAI1) has been reached and the number of established PDU sessions is exceeded significantly from the maximum number.

6. The NSACF returns Nnsacf_NumberOfPDUsPerSliceAvailabilityCheckUpdate response (success).

For example, the NSACF sends, to the SMF, the Nnsacf_NumberOfPDUsPerSliceAvailabilityCheckUpdate response including information indicating that the counting or the managing of the number for the PDU Sessions on the network slice (e.g. S-NSSAI1) is successful. In addition, the Nnsacf_NumberOfPDUsPerSliceAvailabilityCheckUpdate response may include information indicating that transferring the PDU session related to the handover is accepted.

The NSACF returns Nnsacf_NumberOfPDUsPerSliceAvailabilityCheckUpdate response may be called as the NSACF returns Nnsacf_NumberOfPDUsPerSliceAvailabilityCheckUpdate rsp.

7. The UE is in connected mode with active PDU Session(s) over the AMF and the SMF on a network slice (e.g. S-NSSAI1) in 5GS.

In another example, the UE intersystem change can be a handover from non-3GPP access to 3GPP access within the same PLMN. In this case the SMF indicates it to the NSACF in a new parameter in the Nnsacf_NumberOfPDUsPerSliceAvailabilityCheckUpdate request. The new parameter may be called, for example 'non-3GPP to 3GPP handover' or 'non-3gpp access' or any other notation for a parameter to indicate that the UE is undergoing non-3GPP to 3GPP handover. Then the NSACF performs the following behaviour or processes:

- If the NSAC, i.e. quota control for the number of the PDU Sessions per network slice is supported for UEs registered via the non-3GPP access, the SMF indicates it to the NSACF by using a parameter in the Nnsacf_NumberOfPDUsPerSliceAvailabilityCheckUpdate request, for example called 'NSACF support in non-3GPP' or any other notation for a parameter to indicate that the NSAC i.e. quota control is supported in the non-3GPP access, then based on the operator deployment or operator configuration or operator policy, the NSACF may:
  - consider the PDU Session transferred from non-3GPP to 3GPP access as an already counted by the NSAC for quota control while the UE was on the non-3GPP access and the NSACF would not apply a second NSAC i.e. quota control for the PDU Sessions transferred from the non-3GPP access. This is the case where one and same NSAC i.e. quota control is applied for UEs via 3GGP or non 3GPP access, i.e. the PDU Session, is counted once. Similar behaviour applies when the UE moves from 3GPP access to non-3GPP access; or
  - consider the PDU Session transferred from non-3GPP to 3GPP access as not counted yet by the NSAC for quota control while the UE was on the non-3GPP access and the NSACF would apply a second NSAC i.e. quota control for the PDU Sessions transferred from the non-3GPP access. This is the case where two different NSAC i.e. PDU Sessions quota control is applied, once when the UE is on non-3GPP access and another NSAC when the UE is in 3GPP access, i.e. the PDU Session is counted twice, separately for the non-3GPP and separately for the 3GPP access. In this case the NSACF may maintain two separate list for the established PDU Sessions, one for the PDU Session(s) established via the 3GPP access and another one for the PDU Session(s) established via the non-3GPP access. The quota restrictions (or the quota control) can be also per 3GPP access and per non-3GPP access which would allow different maximum numbers for the number of the PDU Sessions established via the 3GPP access and for the number of the PDU Sessions established via the non-3GPP access. Similar behaviour applies when the UE moves from 3GPP access to non-3GPP access.
- If the NSAC, i.e. quota control for the number of the PDU Sessions per network slice is not supported when the UE is registered via the non-3GPP access, the SMF indicates it to the NSACF by using a parameter in the Nnsacf_NumberOfPDUsPerSliceAvailabilityCheckUpdate request, for example called 'NSACF support in non-3GPP' or any other notation for a parameter to indicate that the NSAC is not supported in the non-3GPP access, then the NSACF would consider the PDU Session as not counted by the NSAC for quota control while the UE was on the non-3GPP access and the NSACF would apply the NSAC i.e. quota control for the PDU Sessions transferred from the non-3GPP access. However, if the quota for the number of the PDU Sessions on the network slice via 3GPP access has been reached, the NSACF would not drop an active PDU Session being transferred from non-3GPP access to 3GPP access in order to maintain the service continuity. Similar NSACF behaviour applies when the UE moves from 3GPP access to non-3GPP access and the NSAC i.e. quota control is not supported via the 3GPP access but supported via the non-3GPP access.

It should be noted that the interaction with the NSACF via the Nnsacf_NumberOfPDUsPerSliceAvailability CheckUpdate request message could also be triggered by an SMF+PGW-C.

Figure 3:
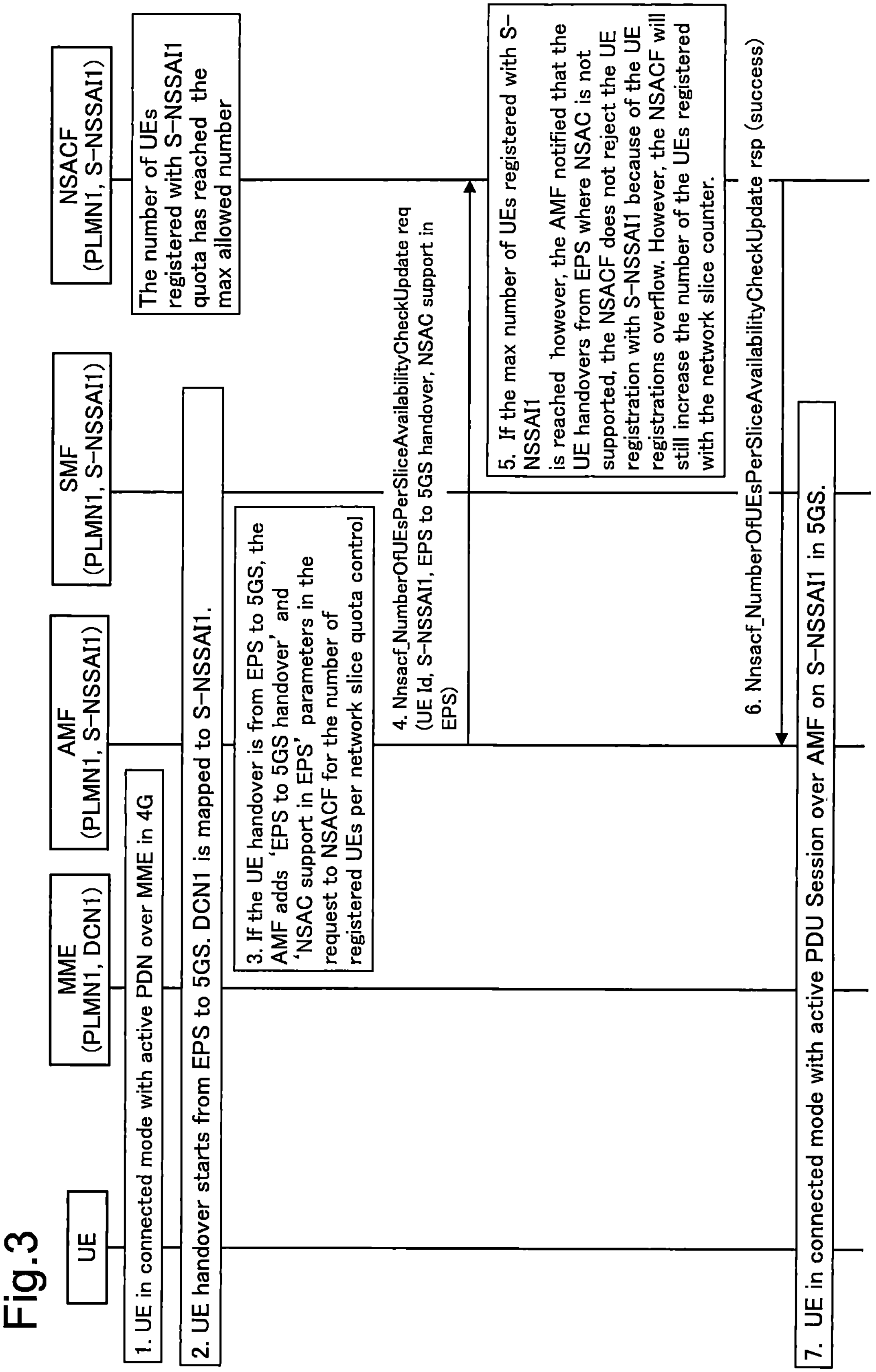
FIG. 3 illustrates Network Slice Admission Control in EPS to 5GS handover in Aspect 1B.

Aspect 1B: Number of registered UEs per network slice control EPS to 5GS handover—The Aspect 1B is a solution for the service continuity problem described in Use Case B in FIG. 1 where the UE drops an active PDU Session(s) at EPS to 5GS handover due to NSAC (Network Slice Admission Control) of the numbers of the UEs registered per network slice overflow in 5GS. This solution, demonstrated in FIG. 3, allows the UE to maintain service continuity at EPS to 5GS handover. For example, the UE is in connected mode in EPS with active PDN connection on DCN1. The UE handovers from EPS to 5GS where DCN1 is mapped to network slice S-NSSAI1. The AMF triggers NSAC (Network Slice Admission Control) for the number of the UEs registered with a network slice quota control procedure as defined in NPL 3. As the UE intersystem change is a handover from EPS to 5GS, the AMF includes a new 'EPS to 5GS handover' parameter and a new 'NSAC support in EPS' in parameter the Nnsacf_NumberOfUEsPerSlice Availability CheckUpdate request message, and the AMF sends the Nnsacf_NumberOfUEsPerSlice Availability-CheckUpdate request message to the NSACF. If 'EPS to 5GS handover' parameter is included and if the 'NSACF support' parameter indicates that the NSAC is not supported in the EPS, the NSACF does not reject (or the NSACF accepts) the UE registration with the network slice S-NSSAI1 even if the quota (i.e. the max allowed number of registered UEs) for the network slice S-NSSAI1 has been reached.

In this Aspect, the NSACF manages the number of registered UEs per network slices. For example, the NSACF may manage the number of registered UEs of a network slice indicated by the S-NSSAI1. The number of registered UEs of a network slice indicated by the S-NSSAI1 may be called as the number of UEs registered with S-NSSAI1. In this Aspect, the number of UEs registered with S-NSSAI1 has reached a predetermined number (e.g. a threshold of the number of UEs registered with S-NSSAI1, or the maximum number of UEs registered with S-NSSAI1).

Note that, the number of UEs registered with S-NSSAI1 may reach the maximum number of UEs registered with S-NSSAI1 at one timing, but the number of UEs registered with S-NSSAI1 may not reach the maximum number after the one timing due to deregistration of the UE.

In addition, the maximum number of UEs registered with S-NSSAI1 may be configured considering a margin.

For example, the network (e.g. the NSACF) may accept a new PDU session even if the maximum number of PDU sessions per S-NSSAI1 has reached.

1. The UE is in connected mode with active PDN connection over the MME in EPS (i.e. 4G).

2. At some stage a handover from EPS to 5GS procedure is triggered as per NPL 3, clause 4.11.1.2. During the EPS to 5GS handover the DCN (Dedicated Core Network) on which the UE has an active PDN connection is mapped to a network slice in 5GS, for example DCN1 is mapped to S-NSSAI1.

During the handover procedure the MME forwards an indicator "NSAC support in EPS" in the Forward Relocation Request message to the AMF. And the AMF knows whether the NSAC is supported or not in EPS.

In one example, in case of homogeneous support or not support of the NSAC in the EPS network, it is preconfigured in the AMF that the entire EPS supports "NSAC" or not. In case of non-homogenous support of NSAC in EPS, the AMF knows whether a particular MME supports NSAC or does not support NSAC feature in the EPS. For example, if the NSAC is supported in EPS, the MME sets the indicator "NSAC support in EPS" indicating that the NSAC is supported in EPS. For example, if the NSAC is not supported in EPS, the MME sets the indicator "NSAC support in EPS" indicating that the NSAC is not supported in EPS.

3. If the UE handover is from EPS to 5GS, the AMF adds, to an Nnsacf_NumberOfUEsPerSliceAvailability CheckUpdate request message, 'EPS to 5GS handover' parameter (or any other notation for a parameter to indicate that the UE is undergoing an EPS to 5GS intersystem change or information indicating that the UE is undergoing an EPS to 5GS intersystem change, or information indicating that the UE is undergoing an EPS to 5GS handover) when interacting with the NSACF for the number of UEs registered with a network slice admission control, i.e. UEs registered per network slice quota control.

The AMF may also include, in the Nnsacf_NumberOfUEsPerSliceAvailabilityCheckUpdate request message, the 'NSAC support in EPS' parameter (or any other notation for a parameter with the purpose to indicate to the NSACF whether NSAC, i.e. quota control in EPS is supported or not).

The 'NSAC support in EPS' parameter may be called as information indicating whether NSAC, i.e. quota control in EPS is supported or not.

For example, the AMF may determine that the UE handover is from EPS to 5GS based on information from the MME during the handover procedure.

For example, the AMF may determine whether NSAC, i.e. quota control in EPS is supported or not based on information from the MME during the handover procedure.

For example, if the indicator "NSAC support in EPS" in the Forward Relocation Request message from the MME indicates that the NSAC is supported in EPS, the AMF may determine that the NSAC is supported in EPS and set the 'NSAC support in EPS' parameter indicating that the NSAC is supported in EPS.

For example, if the indicator "NSAC support in EPS" in the Forward Relocation Request message from the MME indicates that the NSAC is not supported in EPS, the AMF may determine that the NSAC is not supported in EPS and set the 'NSAC support in EPS' parameter indicating that the NSAC is not supported in EPS.

4. The AMF sends the Nnsacf_NumberOfUEsPerSliceAvailabilityCheckUpdate request message to the NSACF. The Nnsacf_NumberOfUEsPerSlice Availability-CheckUpdate request message includes UE ID, S-NSSAI1, the 'EPS to 5GS handover' parameter, and the 'NSAC support in EPS' parameter. The Nnsacf_NumberOfUEsPerSlice AvailabilityCheckUpdate request message may be called as Nnsacf_NumberOfUEsPerSliceAvailability CheckUpdate request. The Nnsacf_NumberOfUEsPerSliceAvailability CheckUpdate request message may be called as Nnsacf_NumberOfUEsPerSlice Availability-CheckUpdate req.

If the UE is coming from EPS e.g. a handover from EPS to 5GS, the AMF includes, in the Nnsacf_NumberOfUEsPerSlice AvailabilityCheckUpdate request, the 'EPS to 5GS handover' parameter.

If the NSAC, i.e. quota control is not supported in the EPS, the AMF also includes, in the Nnsacf_NumberOfUEsPerSlice AvailabilityCheckUpdate request, the 'NSAC support in EPS' parameter which indicates that the NSAC, i.e. quota control is not supported in the EPS.

5. If the maximum number of the UEs registered with a network slice (e.g. S-NSSAI1) is reached however, the AMF included the 'EPS to 5GS handover' parameter in the Nnsacf_NumberOfUEsPerSliceAvailabilityCheckUpdate request and the AMF indicated in the 'NSAC support in EPS' parameter that NSAC, i.e. quota control is not supported in the EPS, the NSACF does not reject (or the NSACF accepts) the UE registration with the network slice (e.g. S-NSSAI1) in 5GS if the maximum number of registered UEs with the network slice (e.g. S-NSSAI1) has been reached. This is to the contrary of the NSACF behaviour when the UE is moving via handover within the 5GS. This differentiated NSACF behaviour at EPS to 5GS intersystem change allows for service continuity in mobility from EPS to 5GS even if the maximum number of the UEs registered with a network slice in 5GS has been reached. However, the NSACF will still increase the number of the UEs registered with the network slice (e.g. S-NSSAI1) counter and the NSACF will also add the UE ID into the list of UEs registered with the network slice maintained in the NSACF for that network slice.

6. The NSACF returns Nnsacf_NumberOfUEsPerSliceAvailabilityCheckUpdate response (success).

For example, the NSACF sends, to the AMF, the Nnsacf_NumberOfUEsPerSliceAvailabilityCheckUpdate response including information indicating that the counting or the managing of the number for the UEs on the network slice (e.g. S-NSSAI1) is successful. In addition, the Nnsacf_NumberOfPDUsPerSliceAvailabilityCheckUpdate response may include information indicating that the UE registration is accepted in the 5GS.

The Nnsacf_NumberOfUEsPerSliceAvailability CheckUpdate response may be called as Nnsacf_NumberOfUEsPerSlice AvailabilityCheckUpdate rsp.

7. The UE is in connected mode with active PDU Session(s) over the AMF and the SMF on a network slice (e.g. S-NSSAI1) in 5GS.

In another example, the UE intersystem change can be a handover from non-3GPP access to 3GPP access within the same PLMN, In this case the AMF indicates it to the NSACF in a new parameter in the Nnsacf_NumberOfUEsPerSlice Availability Check Update request. The new parameter may be called, for example as 'non-3GPP to 3GPP handover' or 'non-3gpp access' or any other notation for a parameter to indicate that the UE is undergoing non-3GPP to 3GPP handover. Then the NSACF performs the following behaviour or processes:

If the NSAC, i.e. quota control for the number of the registered UEs per network slice is supported for UEs registered via the non-3GPP access, the AMF indicates it to the NSACF by using a parameter in the Nnsacf_NumberOfUEsPerSliceAvailabilityCheckUpdate request, for example called 'NSACF support in non-3GPP' or any other notation for a parameter to indicate that the NSAC i.e. quota control is supported in the non-3GPP access, then based on the operator deployment or operator configuration or operator policy, the NSACF may:

- consider the UE registration via the 3GPP access as an already counted by the NSACF for quota control while the UE previously registered via the non-3GPP access and the NSACF would not apply a second NSAC i.e. quota control for the UE registration in 3GPP access. This is the case where one and same NSAC i.e. quota control is applied for UEs registered via non 3GGP and 3GPP access, i.e. the UE registration is counted once. Similar behaviour applies when the UE moves from 3GPP access to non-3GPP access; or
- consider the UE registration via the 3GPP access as not counted yet by the NSACF for quota control. This is the case where two different NSAC i.e. number of registered UEs quota control is applied, once when the UE registers via the non-3GPP access and another NSAC when the UE registers via 3GPP access, i.e. the UE registration is counted twice, separately for the non-3GPP and separately for the 3GPP access. In this case the NSACF may maintain two separate list for the registered UEs, one for the UEs registered via the 3GPP access and another one for the UEs registered via the non-3GPP access. The quota restrictions (or the quota control) can be also per 3GPP access and per non-3GPP access which would allow different maximum numbers for the number of the UEs registered via the 3GPP access and for the number of the UEs registered via the non-3GPP access. Similar behaviour applies when the UE moves from 3GPP access to non-3GPP access.

If the NSAC, i.e. quota control for the number of the registered UEs per network slice is not supported when the UE registers via the non-3GPP access, the AMF indicates it to the NSACF by using a parameter in the Nnsacf_NumberOfUEsPerSlice AvailabilityCheckUpdate request, for example called 'NSACF support in non-3GPP' (or any other notation for a parameter to indicate whether NSAC is supported or not in the non-3GPP access) which indicates that the NSAC, i.e. quota control is not supported via non-3GPP registration, then the NSACF would consider the UE registration over the 3GPP access as not counted by the NSAC for quota control while the UE previously registered via the non-3GPP access and the NSACF would apply the NSAC i.e. quota control for the consequent UE registration via the 3GPP access. However, if the quota for the number registered UEs with the network slice via 3GPP access has been reached, the NSACF would not reject the UE registration so that the active PDU Session being transferred from non-3GPP access to 3GPP access is not dropped because of the UE registration failure via 3GPP access. Hence, the service continuity for the non-3GPP to 3GPP handover is maintained. Similar NSACF behaviour applies when the UE moves from 3GPP access to non-3GPP access and the NSAC i.e. quota control is not supported via the 3GPP access but supported via the non-3GPP access.

For example, the AMF may determine the handover from non-3GPP access to 3GPP access based on information from the MME during the handover procedure.

For example, the AMF may determine whether the NSAC, i.e. quota control for the number of the registered UEs per network slice for UEs registered via the non-3GPP access is supported or not based on information from the MME during the handover procedure.

Yet in one further example the above Aspects can be also executed when the UE has a PDU Session for IMS voice. When a UE has a PDU Session for IMS voice, then the SMF indicates this to NSACF to get or confirm the quota for the S-NSSAI related to the PDU of the voice Session IMS in the Nnsacf_NumberOfPDUsPerSliceAvailabilityCheckUpdate request message with a new 'IMS Voice' parameter for example or any other notation for a parameter to indicate that the PDU Session is related to IMS voice and the NSACF grants admission i.e. quota for the S-NSSAI even though the number of PDU Session established on the S-NSSAI has reached the maximum quota (i.e. the NSACF does not reject (or the NSACF accepts) the PDU Session of the IMS voice even though the number of PDU Session established on the S-NSSAI has reached the maximum number). For example, the SMF may determine that the UE has a PDU Session for IMS voice based on information from the AMF during the handover procedure.

The same principle would be applicable also during the NSAC, i.e. quota control for the number of the UEs registered with the network slice. In this case the AMF indicates in the Nnsacf_NumberOfUEsPerSlice Availability Check Update request message with a new 'IMS Voice' parameter for example or any other notation for a parameter to indicate that the UE registration is related to IMS voice and the NSACF grants admission i.e. quota for the S-NSSAI even though the number of registered UEs with the S-NSSAI has reached the maximum quota (i.e. the NSACF does not reject (or the NSACF accepts) the UE registration for IMS voice even though the number of registered UEs with the S-NSSAI has reached the maximum number). For example, the AMF may determine that the UE has a PDU Session for IMS voice based on information from the MME during the handover procedure.

This principle is also applicable for the case when the UE in Idle mode selects a cell connected to 5GS and the UE is performing idle mode mobility procedure from EPS to 5GS. In this case also the PDN connection/PDU sessions related to the IMS voice is transferred to the EPS even if the maximum number of UEs registered with the S-NSSAI or the maximum number of PDU Sessions established on the S-NSSAI has been reached.

It should be noted that the interaction with the NSACF via the Nnsacf_NumberOfUEsPerSlice AvailabilityCheckUpdate request message could also be triggered by the SMF+PGW-C.

<Aspect 2: Network Slice Admission Control in EPS to 5GS Handover in Case Network Slice Admission Control Takes Place in EPS>

The Solution 2 discloses the Network Slice Admission Control for PDU Session establishment per RAT type. When the UE performs handover between EPS and 5GS, the source system interacts with the NSACF to decrement the number of registered UEs to the network slice or the number of established PDU Sessions on the network slice. Then, the target system interacts with the NSACF to increment the number of registered UEs with the network slice or the number of established PDU Sessions on the network slice. With this sequence, there is a chance that the target system may reject the PDU Session to be activated at the target system due to unavailable quota (e.g. if the maximum number of UEs registered with the network slice or the maximum number of the PDU Sessions on the network slice has been reached).

The FIG. 4 illustrates a possible RAT type, but not exhaustive, which can be used by the NSACF to manage Network Slice Admission Control.

Aspect 2A: Number of PDU Sessions control in EPS to 5GS handover in case Network Slice Admission Control takes place in EPS—The Aspect 2A is a solution for the service continuity problem described in Use Case B in FIG. 1 where the UE drops an active PDU Session(s) at EPS to 5GS handover due to NSAC (Network Slice Admission Control) of the numbers of the PDU Sessions per network slice overflow in the 5GS.

Figure 5:
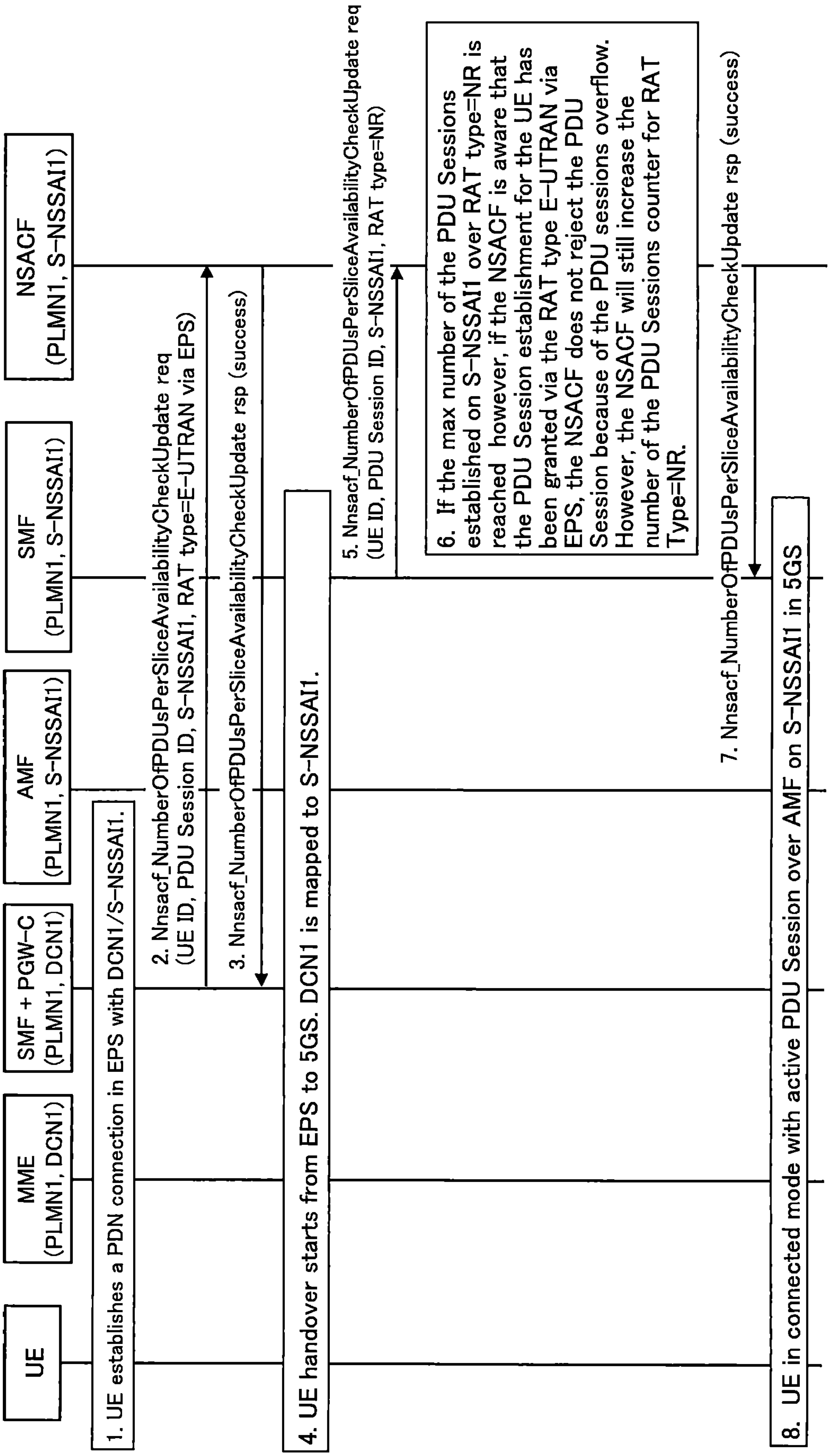
FIG. 5 illustrates Network Slice Admission Control in EPS to 5GS handover in Aspect 2A.

This solution, demonstrated in FIG. 5, allows the UE to maintain service continuity at EPS to 5GS handover. For example, the UE is in connected mode in EPS with active PDN connection on DCN1. The UE handovers to 5GS where DCN1 is mapped to network slice S-NSSAI1. The SMF triggers NSAC (Network Slice Admission Control) for the number of the PDU Sessions established on a network slice quota control procedure as defined in NPL 3. As the Nnsacf_NumberOfPDUsPerSliceAvailability CheckUpdate request message includes the RAT type, the NSACF can track how the UE moves between the systems.

1. The UE establishes a PDN connection in the EPS with DCN1/S-NSSAI1. The DCN1 is mapped to the network slice S-NSSAI1.

2. The SMF+PGW-C sends an Nnsacf_NumberOfPDUsPerSlice AvailabilityCheckUpdate request message to the NSACF.

The Nnsacf_NumberOfPDUsPerSliceAvailability CheckUpdate request message includes UE ID (i.e. identifier for the UE), PDU Session ID, and S-NSSAI1.

In addition, the SMF+PGW-C also includes, in the Nnsacf_NumberOfPDUsPerSliceAvailabilityCheckUpdate request message, a parameter, for example called 'RAT Type' or any other notation for a parameter in order to indicate the current active RAT for the UE. In this case the RAT Type is set to E-UTRAN via EPS, for example.

For example, the 'RAT Type=E-UTRAN via EPS' may be information indicating that the RAT type which the UE uses is E-UTRAN via EPS. The 'RAT Type=E-UTRAN via EPS' may mean that the current RAT type is E-UTRAN via EPS.

For example, the SMF+PGW-C is apparatus or node having function for the SMF and function for the PGW-C. The SMF+PGW-C may determine that the RAT type is E-UTRAN via EPS based on information retrieved during the establishment the PDN connection.

3. Upon reception of the Nnsacf_NumberOfPDUsPerSliceAvailabilityCheckUpdate request message, the NSACF stores the UE ID together with RAT Type=E-UTRAN via EPS for the S-NSSAI 1 and increments the number of established PDU Sessions counter for S-NSSAI 1 over the RAT Type=E-UTRAN via EPS. Then, the NSACF returns the Nnsacf_NumberOfPDUsPerSliceAvailabilityCheckUpdate response message to the SMF+PGW-C.

For example, the NSACF may know that the DCN1 is mapped to the S-NSSAI1. Hence, the NSACF may treat the PDN connection for the UE as the PDU session on the S-NSSAI1 for the UE. Or the NSACF may treat the PDN connection for the UE as the PDU Session on the S-NSSAI1 which has been granted over the RAT type which is E-UTRAN via EPS. Then, the NSACF may increment the counter for the S-NSSAI1. In addition to the increment, for example, the NSACF may store and manage a record that the PDU Session establishment on S-NSSAI1 for the UE has been granted. The record that the PDU Session establishment on S-NSSAI1 for the UE has been granted may be called as a record that the PDU session establishment for the UE has been granted via the RAT type which is E-UTRAN via EPS. The mapping of the DCN1 and the S-NSSAI1 may be called as the mapping of the E-UTRAN via EPS related to the DCN 1 and the NR related to the S-NSSAI 1.

4. At some stage a handover from EPS to 5GS procedure is triggered as per NPL 3, clause 4.11.1.2. During the EPS to 5GS handover the DCN (Dedicated Core Network) on which the UE has an active PDN connection is mapped to a network slice in 5GS, for example DCN1 is mapped to S-NSSAI1.

5. The SMF sends an Nnsacf_NumberOfPDUs-PerSliceAvailabilityCheckUpdate request message to the NSACF for the purpose of NSAC i.e. quota control for the number of PDU Session on the network slice, e.g. S-NSSAI1.

The Nnsacf_NumberOfPDUsPerSliceAvailability Check-Update request message includes UE ID, PDU Session ID, S-NSSAI1, and RAT Type=NR.

The SMF includes the 'RAT Type' parameter set to NR in order to indicate the current active RAT.

For example, the 'RAT Type=NR' may be information indicating that the RAT type which the UE uses after the handover is NR or information indicating that a target RAT type for the handover is NR. The 'RAT Type=NR' may mean that the RAT type is NR.

For example, the SMF may determine that the RAT type is NR based on information from the AMF during the handover procedure.

6. If the maximum number of the PDU Sessions for a network slice (e.g. S-NSSAI 1) over the NR is reached however, the NSACF has already registered the PDU Session with the S-NSSAI1 with a RAT Type=E-UTRAN via EPS (e.g. the NSACF manages the record that the PDU session establishment for the UE has been granted via the RAT type which is E-UTRAN via EPS), then the NSACF does not reject (or the NSACF accepts) the PDU Session(s) with RAT type=NR even if the maximum number of the PDU Sessions on the network slice (e.g. S-NSSAI1) has been reached for the RAT type=NR as the NSACF becomes aware at this point that the UE is moving from the EPS to 5GS. This is to the contrary of the NSACF behaviour when the UE is moving via handover within the 5GS. This differentiated NSACF behaviour for the EPS to 5GS inter-system change allows for service continuity in mobility from EPS to 5GS even if the maximum number of the PDU Sessions on the network slice has been reached. However, the NSACF will still increase the number of the PDU Sessions counter for the network slice and the NSACF will also add the UE ID and PDU Session ID into the list of UEs and PDU Sessions maintained in the NSACF for that network slice over the RAT Type=NR.

In one example, the NSACF may reject the PDU Session(s) if the maximum number of the PDU Sessions on the network slice (e.g. S-NSSAI1) has significantly exceeded the maximum number allowed PDU Session on the network slice (e.g. exceeded the allowed exception quota overflow number set up by operator configuration or operator policy in the NSACF).

In one example, the NSACF may reject the PDU Session(s) if the maximum number of the PDU Sessions on the network slice (e.g. S-NSSAI1) has been reached and the number of established PDU sessions is exceeded significantly from the maximum number.

7. The NSACF returns Nnsacf_NumberOfPDUsPerSlice AvailabilityCheckUpdate response (success) to the SMF.

For example, the NSACF sends, to the SMF, the Nnsacf_NumberOfPDUsPerSlice AvailabilityCheckUpdate response including information indicating that the counting or the managing of the number for the PDU Sessions on the network slice (e.g. S-NSSAI1) is successful. The Nnsacf_NumberOfPDUsPerSliceAvailabilityCheckUpdate response may be called as Nnsacf_NumberOfPDUs-PerSliceAvailabilityCheckUpdate rsp.

8. The UE is in connected mode with active PDU Session (s) over the AMF and the SMF on a network slice (e.g. S-NSSAI1) in 5GS.

Figure 6:
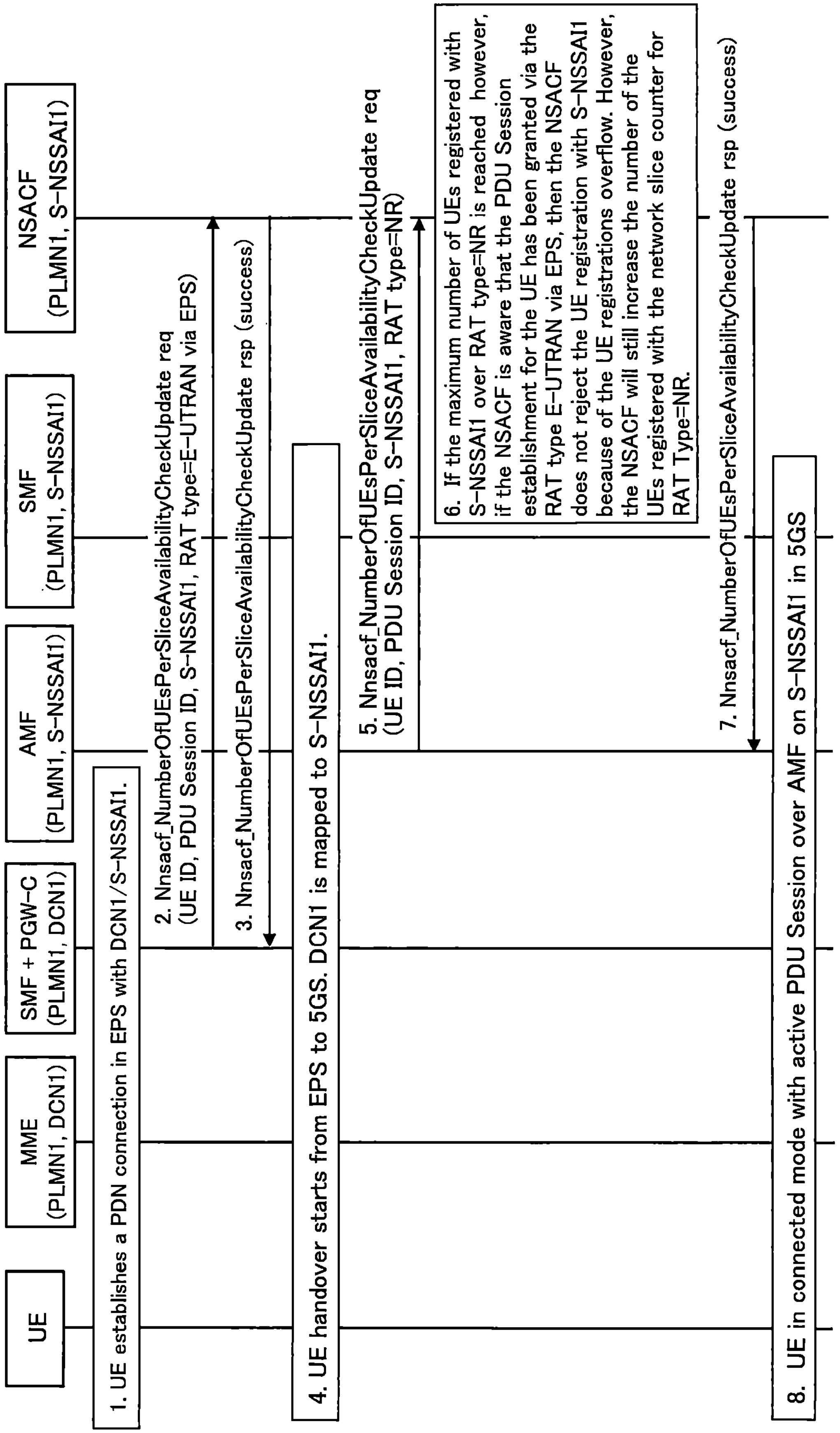
FIG. 6 illustrates Network Slice Admission Control in EPS to 5GS handover in Aspect 2B.

Aspect 2B: Number of UEs control in EPS to 5GS handover in case Network Slice Admission Control takes place in EPS—The Aspect 2B is a solution for the service continuity problem described in Use Case B in FIG. 1 where the UE drops an active PDU Session(s) at EPS to 5GS handover due to NSAC (Network Slice Admission Control) of the numbers of the UEs registered per network slice overflow in the 5GS. This solution, demonstrated in FIG. 6, allows the UE to maintain service continuity at EPS to 5GS handover. For example, the UE is in connected mode in EPS with active PDN connection on DCN1. The UE handovers to 5GS where DCN1 is mapped to network slice S-NSSAI1. The AMF triggers NSAC (Network Slice Admission Control) for the number of the UEs registered on a network slice quota control procedure as defined in NPL 3. As the Nnsacf_NumberOfUEsPerSlice Availability Check Update request message includes the RAT type, the NSACF can track how the UE moves between the systems.

1. The UE establishes a PDN connection in the EPS with DCN1/S-NSSAI1. The DCN1 is mapped to the network slice S-NSSAI1.

2. The SMF+PGW-C sends an Nnsacf_NumberOfUEs-PerSlice AvailabilityCheckUpdate request message to the NSACF. The Nnsacf_NumberOfUEsPerSliceAvailability CheckUpdate request message includes UE ID, PDU Session ID, and S-NSSAI1.

In addition, the SMF+PGW-C also includes, in the Nnsacf_NumberOfUEsPerSlice AvailabilityCheckUpdate request message, a parameter, for example called 'RAT Type' or any other notation for a parameter in order to indicate the current active RAT. In this case the RAT Type is set to E-UTRAN via EPS, for example.

For example, the 'RAT Type=E-UTRAN via EPS' may be information indicating that the RAT type which the UE uses is E-UTRAN via EPS. The 'RAT Type=E-UTRAN via EPS' may mean that the current RAT type is E-UTRAN via EPS.

For example, the SMF+PGW-C is apparatus or node having function for the SMF and function for the PGW-C. The SMF+PGW-C may determine that the RAT type is E-UTRAN via EPS based on information retrieved during the establishment the PDN connection.

3. Upon reception of the Nnsacf_NumberOfUEsPerSlice Availability CheckUpdate request message, the NSACF stores the UE ID together with RAT Type=E-UTRAN via EPS for the S-NSSAI 1 and increments the number of the UEs registered counter for S-NSSAI 1 over the RAT Type=E-UTRAN via EPS. Then, the NSACF sends the Nnsacf_NumberOfUEsPerSliceAvailabilityCheckUpdate response message to the SMF+PGW-C.

For example, the NSACF may know that the DCN1 is mapped to the S-NSSAI1. Hence, the NSACF may treat the UE which has attached over the RAT type which is E-UTRAN via EPS as the UE which has registered for the S-NSSAI 1 over the RAT type which is NR. Then, the NSACF may increment the counter for the S-NSSAI1.

In addition to the increment, the NSACF may store and manage a record that the UE has registered on S-NSSAI1. The record that the UE has registered on S-NSSAI1 may be called as a record that the UE has been registered via the RAT type which is E-UTRAN via EPS.

4. At some stage a handover from EPS to 5GS procedure is triggered as per NPL 3, clause 4.11.1.2. During the EPS to 5GS handover the DCN (Dedicated Core Network) on which the UE has an active PDN connection is mapped to a network slice in 5GS, for example DCN1 is mapped to S-NSSAI1.

5. The AMF sends an Nnsacf_NumberOfUEsPerSlice AvailabilityCheckUpdate request message to the NSACF for the purpose of NSAC i.e. quota control for the number of registered UEs on the network slice, e.g. S-NSSAI1.

The Nnsacf_NumberOfUEsPerSlice Availability Check-Update request message includes UE ID, PDU Session ID, S-NSSAI1, and RAT Type=NR.

The AMF includes the 'RAT Type' parameter set to NR in order to indicate the current active RAT.

For example, the 'RAT Type=NR' may be information indicating that the RAT type which the UE uses after the handover is NR or information indicating that a target RAT type for the handover is NR. The 'RAT Type=NR' may mean that the RAT type is NR.

For example, the AMF may determine that the RAT type is NR based on information from the MME during the handover procedure.

6. If the maximum number of the UEs registered for a network slice (e.g. S-NSSAI 1) over the NR is reached however, the NSACF has already registered the PDU Session with the S-NSSAI1 with a RAT Type=E-UTRAN via EPS (e.g. the NSACF manages the record that the UE has been registered via the RAT type which is E-UTRAN via EPS), then the NSACF does not reject (or the NSACF accepts) the UE registration for the network slice with RAT type=NR if the maximum number of the UEs registered with the network slice (e.g. S-NSSAI1) has been reached for the RAT type=NR as the NSACF is aware at this point that the UE is moving from the EPS to 5GS with an active PDU Session. This is to the contrary of the NSACF behaviour when the UE is moving via handover within the 5GS. This differentiated NSACF behaviour for the EPS to 5GS inter-system change allows for service continuity in mobility from EPS to 5GS even if the maximum number of the UEs registered on the network slice has been reached. However, the NSACF will still increase the number of the UEs registered counter for the network slice and the NSACF will also add the UE ID into the list of UEs registered in the NSACF for that network slice over the RAT type=NR.

In one example, the NSACF may reject the UE registration for the network slice if the maximum number of the registered UEs with the network slice (e.g. S-NSSAI1) has exceeded significantly the maximum allowed UE registrations on the network slice (e.g. exceeded the allowed exception quota overflow number set up by operator configuration or operator policy in the NSACF).

In one example, the NSACF may reject the UE registration if the maximum number of the UEs on the network slice (e.g. S-NSSAI1) has been reached and the number of registered UEs exceeded significantly from the maximum number.

7. The NSACF returns Nnsacf_NumberOfUEsPerSlice Availability CheckUpdate response (success) to the AMF.

For example, the NSACF sends, to the AMF, the Nnsacf_NumberOfUEsPerSliceAvailabilityCheckUpdate response including information indicating that the counting or the managing of the number for the UEs on the network slice (e.g. S-NSSAI1) is successful.

8. The UE is in connected mode with active PDU Session(s) over AMF/SMF on a network slice (e.g. S-NSSAI1) in 5GS.

This disclosure and the aspects solve a problem with the service continuity at EPS to 5GS inter system change (or EPS to 5GS handover or EPS to 5GS mobility).

<System Overview>

Figure 7:
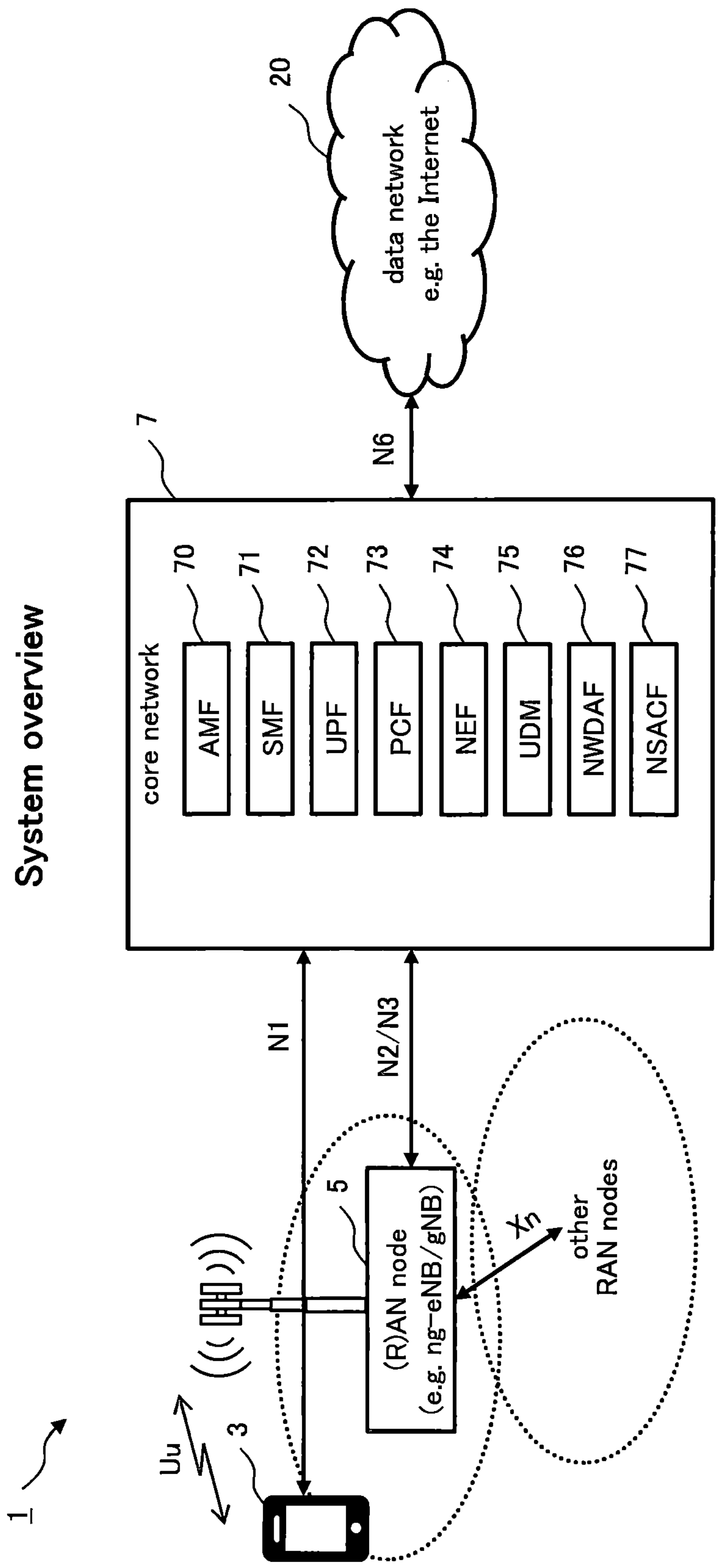
FIG. 7 illustrates System overview.

FIG. 7 schematically illustrates a telecommunication system 1 for a mobile (cellular or wireless) to which the above aspects are applicable.

The telecommunication system 1 represents a system overview in which an end to end communication is possible. For example, UE 3 (or user equipment, 'mobile device' 3) communicates with other UEs 3 or service servers in the data network 20 via respective (R)AN nodes 5 and a core network 7.

The (R)AN node 5 supports any radio accesses including a 5G radio access technology (RAT), an E-UTRA radio access technology, a beyond 5G RAT, a 6G RAT and non-3GPP RAT including wireless local area network (WLAN) technology as defined by the Institute of Electrical and Electronics Engineers (IEEE).

The (R)AN node 5 may split into a Radio Unit (RU), Distributed Unit (DU) and Centralized Unit (CU). In some aspects, each of the units may be connected to each other and structure the (R)AN node 5 by adopting an architecture as defined by the Open RAN (O-RAN) Alliance, where the units above are referred to as O-RU, O-DU and O-CU respectively.

The (R)AN node 5 may be split into control plane function and user plane function. Further, multiple user plane functions can be allocated to support a communication. In some aspects, user traffic may be distributed to multiple user plane functions and user traffic over each user plane functions are aggregated in both the UE 3 and the (R)AN node 5. This split architecture may be called as 'dual connectivity' or 'Multi connectivity'.

The (R)AN node 5 can also support a communication using the satellite access. In some aspects, the (R)AN node 5 may support a satellite access and a terrestrial access.

In addition, the (R)AN node 5 can also be referred as an access node for a non-wireless access. The non-wireless access includes a fixed line access as defined by the Broadband Forum (BBF) and an optical access as defined by the Innovative Optical and Wireless Network (IOWN).

The core network 7 may include logical nodes (or 'functions') for supporting a communication in the telecommunication system 1. For example, the core network 7 may be 5G Core Network (5GC) that includes, amongst other functions, control plane functions and user plane functions. Each function in a logical nodes can be considered as a network function. The network function may be provided to another node by adapting the Service Based Architecture (SBA).

A Network Function can be deployed as distributed, redundant, stateless, and scalable that provides the services from several locations and several execution instances in each location by adapting the network virtualization technology as defined by the European Telecommunications Standards Institute, Network Functions Virtualization (ETSI NFV).

The core network 7 may support the Non-Public Network (NPN). The NPN may be a Stand-alone Non-Public Network (SNPN) or a Public Network Integrated NPN (PNI-NPN).

As is well known, a UE 3 may enter and leave the areas (i.e. radio cells) served by the (R)AN node 5 as the UE 3 is moving around in the geographical area covered by the telecommunication system 1. In order to keep track of the UE 3 and to facilitate movement between the different (R)AN nodes 5, the core network 7 comprises at least one access and mobility management function (AMF) 70. The AMF 70 is in communication with the (R)AN node 5 coupled to the core network 7. In some core networks, a mobility management entity (MME) or a mobility management node for beyond 5G or a mobility management node for 6G may be used instead of the AMF 70.

The core network 7 also includes, amongst others, a Session Management Function (SMF) 71, a User Plane Function (UPF) 72, a Policy Control Function (PCF) 73, a Network Exposure Function (NEF) 74, a Unified Data Management (UDM) 75, a Network Data Analytics Function (NWDAF) 76 and NSACF (Network Slice Admission Control Function) 77. In addition, the core network 7 may also include SMF+PGW-C. When the UE 3 is roaming to a visited Public Land Mobile Network (VPLMN), a home Public Land Mobile Network (HPLMN) of the UE 3 provides the UDM 75 and at least some of the functionalities of the SMF 71, UPF 72, and PCF 73 for the roaming-out UE 3.

The UE 3 and a respective serving (R)AN node 5 are connected via an appropriate air interface (for example the so-called "Uu" interface and/or the like). Neighboring (R)AN node 5 are connected to each other via an appropriate (R)AN node 5 to (R)AN node interface (such as the so-called "Xn" interface and/or the like). Each (R)AN node 5 is also connected to nodes in the core network 7 (such as the so-called core network nodes) via an appropriate interface (such as the so-called "N2"/"N3" interface(s) and/or the like). From the core network 7, connection to a data network 20 is also provided. The data network 20 can be an internet, a public network, an external network, a private network or an internal network of the PLMN. In case that the data network 20 is provided by a PLMN operator or Mobile Virtual Network Operator (MVNO), the IP Multimedia Subsystem (IMS) service may be provided by that data network 20. The UE 3 can be connected to the data network 20 using IPv4, IPv6, IPv4v6, Ethernet or unstructured data type.

The "Uu" interface may include a Control plane of Uu interface and User plane of Uu interface.

The User plane of Uu interface is responsible to convey user traffic between the UE 3 and a serving (R)AN node 5. The User plane of Uu interface may have a layered structure with SDAP, PDCP, RLC and MAC sublayer over the physical connection.

The Control plane of Uu interface is responsible to establish, modify and release a connection between the UE 3 and a serving (R)AN node 5. The Control plane of Uu interface may have a layered structure with RRC, PDCP, RLC and MAC sublayers over the physical connection.

For example, the following messages are communicated over the RRC layer to support AS signaling.

- RRC Setup Request message: This message is sent from the UE 3 to the (R)AN node 5. In addition to the parameters that are disclosed by Aspects in this disclosure, following parameters may be included together in the RRC Setup Request message.
  - establishmentCause and ue-Identity. The ue-Identity may have a value of ng-5G-S-TMSI-Part1 or random Value.
- RRC Setup message: This message is sent from the (R)AN node 5 to the UE 3. In addition to the parameters that are disclosed by Aspects in this disclosure, following parameters may be included together in the RRC Setup message.
  - masterCellGroup and radioBearerConfig
- RRC Setup Complete message: This message is sent from the UE 3 to the (R)AN node 5. In addition to the parameters that are disclosed by Aspects in this disclosure, following parameters may be included together in the RRC Setup Complete message.
  - guami-Type, iab-NodeIndication, idleMeas Available, mobility State, ng-5G-S-TMSI-Part2, registeredAMF, selectedPLMN-Identity The UE 3 and the AMF 70 are connected via an appropriate interface (for example the so-called N1 interface and/or the like). The N1 interface is responsible to provide a communication between the UE 3 and the AMF 70 to support NAS signaling. The N1 interface may be established over a 3GPP access and over a non-3GPP access. For example, the following messages are communicated over the N1 interface.

- Registration Request message: This message is sent from the UE 3 to the AMF 70. In addition to the parameters that are disclosed by Aspects in this disclosure, following parameters may be included together in the Registration Request message.
  - 5GS registration type, ngKSI, 5GS mobile identity, Non-current native NAS key set identifier, 5GMM capability, UE security capability, Requested NSSAI, Last visited registered TAI, S1 UE network capability, Uplink data status, PDU session status, MICO indication, UE status, Additional GUTI, Allowed PDU session status, UE's usage setting, Requested DRX parameters, EPS NAS message container, LADN indication, Payload container type, Payload container, Network slicing indication, 5GS update type, Mobile station classmark 2, Supported codecs, NAS message container, EPS bearer context status, Requested extended DRX parameters, T3324 value, UE radio capability ID, Requested mapped NSSAI, Additional information requested, Requested WUS assistance information, N5GC indication and Requested NB-N1 mode DRX parameters.
- Registration Accept message: This message is sent from the AMF 70 to the UE 3. In addition to the parameters that are disclosed by Aspects in this disclosure, following parameters may be included together in the Registration Accept message.
  - 5GS registration result, 5G-GUTI, Equivalent PLMNs, TAI list, Allowed NSSAI, Rejected NSSAI, Configured NSSAI, 5GS network feature support, PDU session status, PDU session reactivation result, PDU session reactivation result error cause, LADN information, MICO indication, Network slicing indication, Service area list, T3512 value, Non-3GPP de-registration timer value, T3502 value, Emergency number list, Extended emergency number list, SOR transparent container, EAP message, NSSAI inclusion mode, Operator-defined access category definitions, Negotiated DRX parameters, Non-3GPP NW policies, EPS bearer context status, Negotiated extended DRX parameters, T3447 value, T3448 value, T3324 value, UE radio capability ID, UE radio capability ID deletion indication, Pending NSSAI, Ciphering key data, CAG information list, Truncated 5G-S-TMSI configuration, Negotiated WUS assistance information, Negotiated NB-N1 mode DRX parameters and Extended rejected NSSAI.

Registration Complete message: This message is sent from the UE 3 to the AMF 70. In addition to the parameters that are disclosed by Aspects in this disclosure, following parameters may be included together in the Registration Complete message.

SOR transparent container.

Authentication Request message: This message is sent from the AMF 70 to the UE 3. In addition to the parameters that are disclosed by Aspects in this disclosure, following parameters may be included together in the Authentication Request message.

ngKSI, ABBA, Authentication parameter RAND (5G authentication challenge), Authentication parameter AUTN (5G authentication challenge) and EAP message.

Authentication Response message: This message is sent from the UE 3 to the AMF 70. In addition to the parameters that are disclosed by Aspects in this disclosure, following parameters may be populated together in the Authentication Response message.

Authentication response message identity, Authentication response parameter and EAP message.

Authentication Result message: This message is sent from the AMF 70 to the UE 3. In addition to the parameters that are disclosed by Aspects in this disclosure, following parameters may be populated together in the Authentication Result message.

ngKSI, EAP message and ABBA.

Authentication Failure message: This message is sent from the UE 3 to the AMF 70. In addition to the parameters that are disclosed by Aspects in this disclosure, following parameters may be populated together in the Authentication Failure message.

Authentication failure message identity, 5GMM cause and Authentication failure parameter.

Authentication Reject message: This message is sent from the AMF 70 to the UE 3. In addition to the parameters that are disclosed by Aspects in this disclosure, following parameters may be populated together in the Authentication Reject message.

EAP message.

Service Request message: This message is sent from the UE 3 to the AMF 70. In addition to the parameters that are disclosed by Aspects in this disclosure, following parameters may be populated together in the Service Request message.

ngKSI, Service type, 5G-S-TMSI, Uplink data status, PDU session status, Allowed PDU session status, NAS message container.

Service Accept message: This message is sent from the AMF 70 to the UE 3. In addition to the parameters that are disclosed by Aspects in this disclosure, following parameters may be populated together in the Service Accept message.

PDU session status, PDU session reactivation result, PDU session reactivation result error cause, EAP message and T3448 value.

Service Reject message: This message is sent from the AMF 70 to the UE 3. In addition to the parameters that are disclosed by Aspects in this disclosure, following parameters may be populated together in the Service Reject message.

5GMM cause, PDU session status, T3346 value, EAP message, T3448 value and CAG information list.

Configuration Update Command message: This message is sent from the AMF 70 to the UE 3. In addition to the parameters that are disclosed by Aspects in this disclosure, following parameters may be populated together in the Configuration Update Command message.

Configuration update indication, 5G-GUTI, TAI list, Allowed NSSAI, Service area list, Full name for network, Short name for network, Local time zone, Universal time and local time zone, Network daylight saving time, LADN information, MICO indication, Network slicing indication, Configured NSSAI, Rejected NSSAI, Operator-defined access category definitions, SMS indication, T3447 value, CAG information list, UE radio capability ID, UE radio capability ID deletion indication, 5GS registration result, Truncated 5G-S-TMSI configuration, Additional configuration indication and Extended rejected NSSAI.

Configuration Update Complete message: This message is sent from the UE 3 to the AMF 70. In addition to the parameters that are disclosed by Aspects in this disclosure, following parameters may be populated together in the Configuration Update Complete message.

Configuration update complete message identity.

<User Equipment (UE)>

Figure 8:
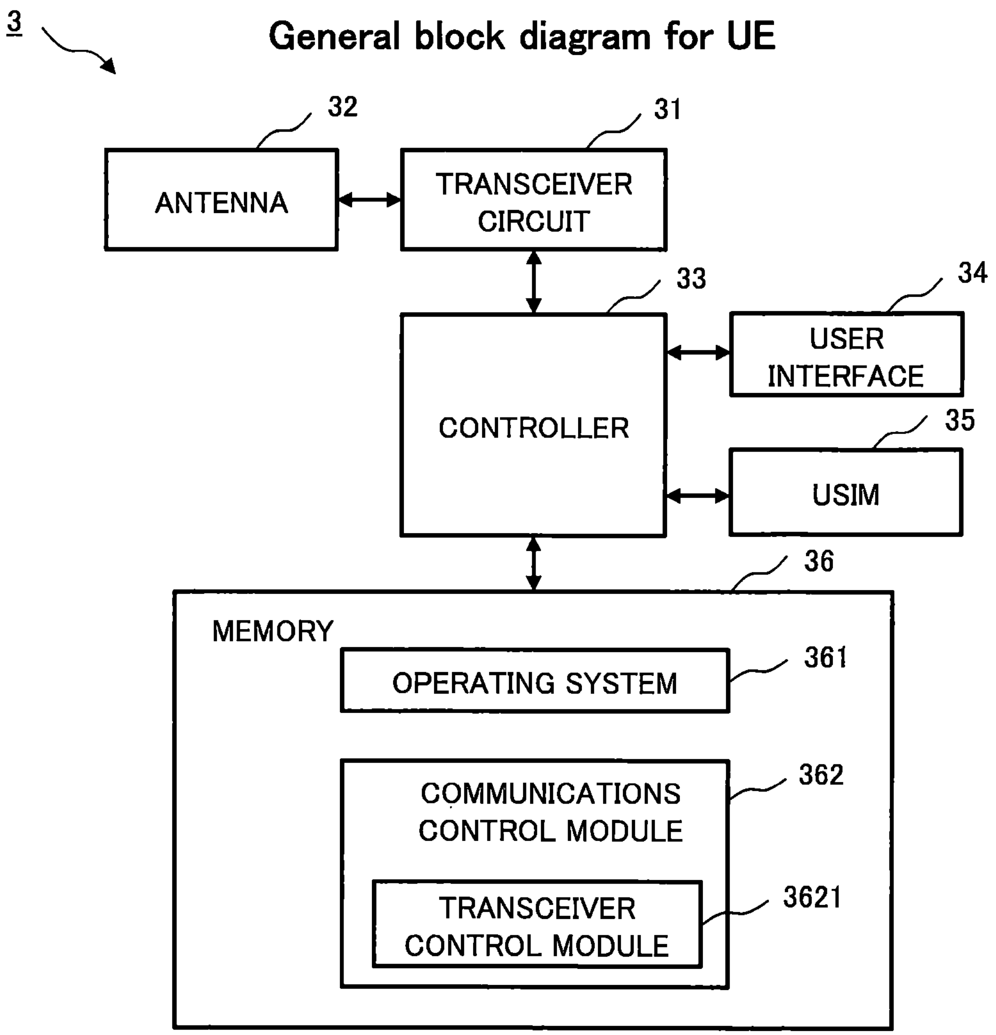
FIG. 8 is a block diagram for a UE.

FIG. 8 is a block diagram illustrating the main components of the UE 3 (mobile device 3). As shown, the UE 3 includes a transceiver circuit 31 which is operable to transmit signals to and to receive signals from the connected node(s) via one or more antennas 32. Further, the UE 3 may include a user interface 34 for inputting information from outside or outputting information to outside. Although not necessarily shown in the Figure, the UE 3 may have all the usual functionality of a conventional mobile device and this may be provided by any one or any combination of hardware, software and firmware, as appropriate. Software may be pre-installed in the memory and/or may be downloaded via the telecommunication network or from a removable data storage device (RMD), for example. A controller 33 controls the operation of the UE 3 in accordance with software stored in a memory 36. The software includes, among other things, an operating system 361 and a communications control module 362 having at least a transceiver control module 3621. The communications control module 362 (using its transceiver control module 3621) is responsible for handling (generating/sending/receiving) signalling and uplink/downlink data packets between the UE 3 and other nodes, such as the (R) AN node 5 and the AMF 70. Such signalling may include, for example, appropriately formatted signalling messages (e.g. a registration request message and associated response messages) relating to access and mobility management procedures (for the UE 3). The controller 33 interworks with one or more Universal Subscriber Identity Module (USIM) 35. If there are multiple USIMs 35 equipped, the controller 33 may activate only one USIM 35 or may activate multiple USIMs 35 at the same time.

The UE 3 may, for example, support the Non-Public Network (NPN). The NPN may be a Stand-alone Non-Public Network (SNPN) or a Public Network Integrated NPN (PNI-NPN).

The UE 3 may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

The UE 3 may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

The UE 3 may, for example, be an item of information and communication equipment (for example information and communication equipment such as: electronic computer and related equipment; communication and related equipment; electronic components etc.).

The UE 3 may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

The UE 3 may, for example, be an electrical application system or equipment (for example an electrical application system or equipment such as: an x-ray system; a particle accelerator; radio isotope equipment; sonic equipment; electromagnetic application equipment; electronic power application equipment etc.).

The UE 3 may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

The UE 3 may, for example, be a wireless-equipped personal digital assistant or related equipment (such as a wireless card or module designed for attachment to or for insertion into another electronic device (for example a personal computer, electrical measuring machine)).

The UE 3 may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE 3 may support one or more IoT or MTC applications.

The UE 3 may be a smart phone or a wearable device (e.g. smart glasses, a smart watch, a smart ring, or a hearable device).

The UE 3 may be a car, or a connected car, or an autonomous car, or a vehicle device, or a motorcycle or V2X (Vehicle to Everything) communication module (e.g. Vehicle to Vehicle communication module, Vehicle to Infrastructure communication module, Vehicle to People communication module and Vehicle to Network communication module).

<(R)AN Node>

Figure 9:
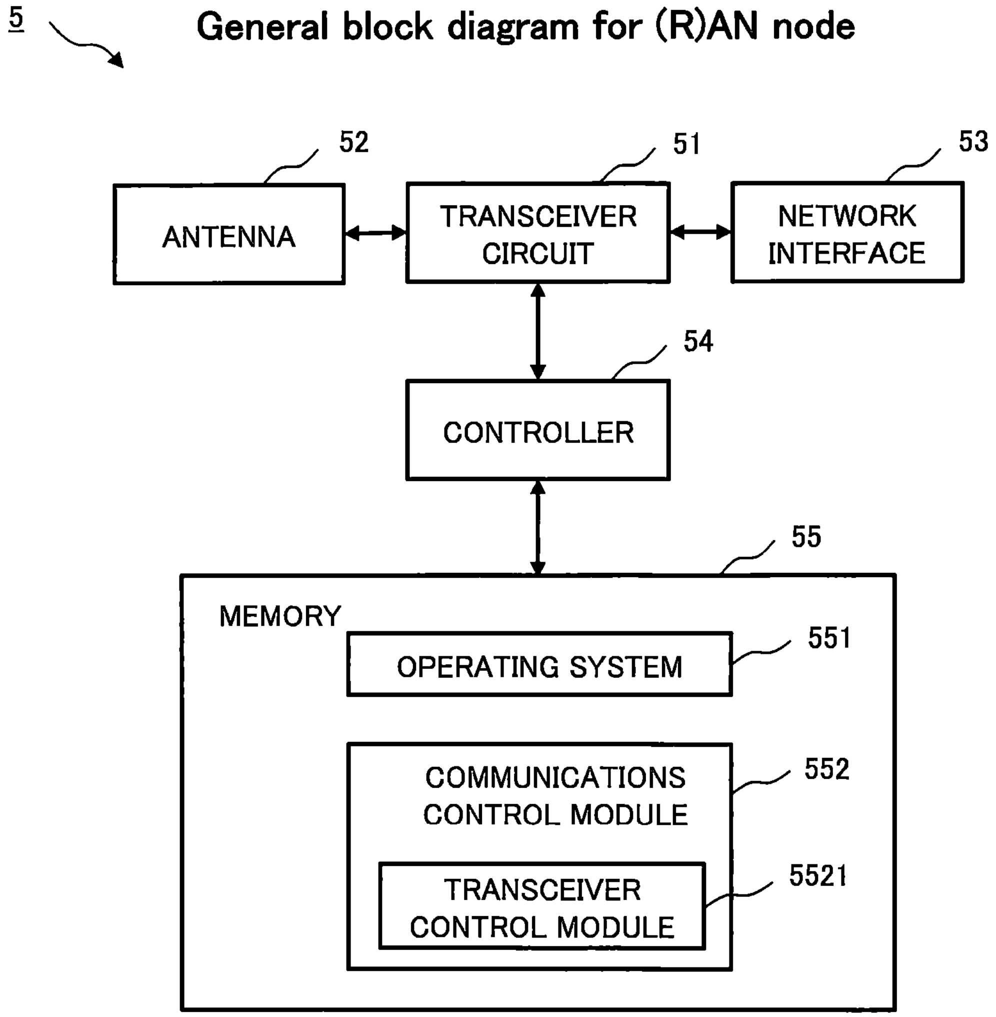
FIG. 9 is a block diagram for a (R)AN node.

FIG. 9 is a block diagram illustrating the main components of an exemplary (R)AN node 5, for example a base station ('eNB' in LTE, 'gNB' in 5G, a base station for 5G beyond, a base station for 6G). As shown, the (R)AN node 5 includes a transceiver circuit 51 which is operable to transmit signals to and to receive signals from connected UE(s) 3 via one or more antennas 52 and to transmit signals to and to receive signals from other network nodes (either directly or indirectly) via a network interface 53. A controller 54 controls the operation of the (R)AN node 5 in accordance with software stored in a memory 55. Software may be pre-installed in the memory and/or may be downloaded via the telecommunication network or from a removable data storage device (RMD), for example. The software includes, among other things, an operating system 551 and a communications control module 552 having at least a transceiver control module 5521.

The communications control module 552 (using its transceiver control sub-module) is responsible for handling (generating/sending/receiving) signalling between the (R)AN node 5 and other nodes, such as the UE 3, another (R)AN node 5, the AMF 70 and the UPF 72 (e.g. directly or indirectly). The signalling may include, for example, appropriately formatted signalling messages relating to a radio connection and a connection with the core network 7 (for a particular UE 3), and in particular, relating to connection establishment and maintenance (e.g. RRC connection establishment and other RRC messages), NG Application Protocol (NGAP) messages (i.e. messages by N2 reference point) and Xn application protocol (XnAP) messages (i.e. messages by Xn reference point), etc. Such signalling may also include, for example, broadcast information (e.g. Master Information and System information) in a sending case.

The controller 54 is also configured (by software or hardware) to handle related tasks such as, when implemented, UE mobility estimate and/or moving trajectory estimation.

The (R)AN node 5 may support the Non-Public Network (NPN). The NPN may be a Stand-alone Non-Public Network (SNPN) or a Public Network Integrated NPN (PNI-NPN).

<System Overview of (R)AN Node 5 Based on O-RAN Architecture>

Figure 10:
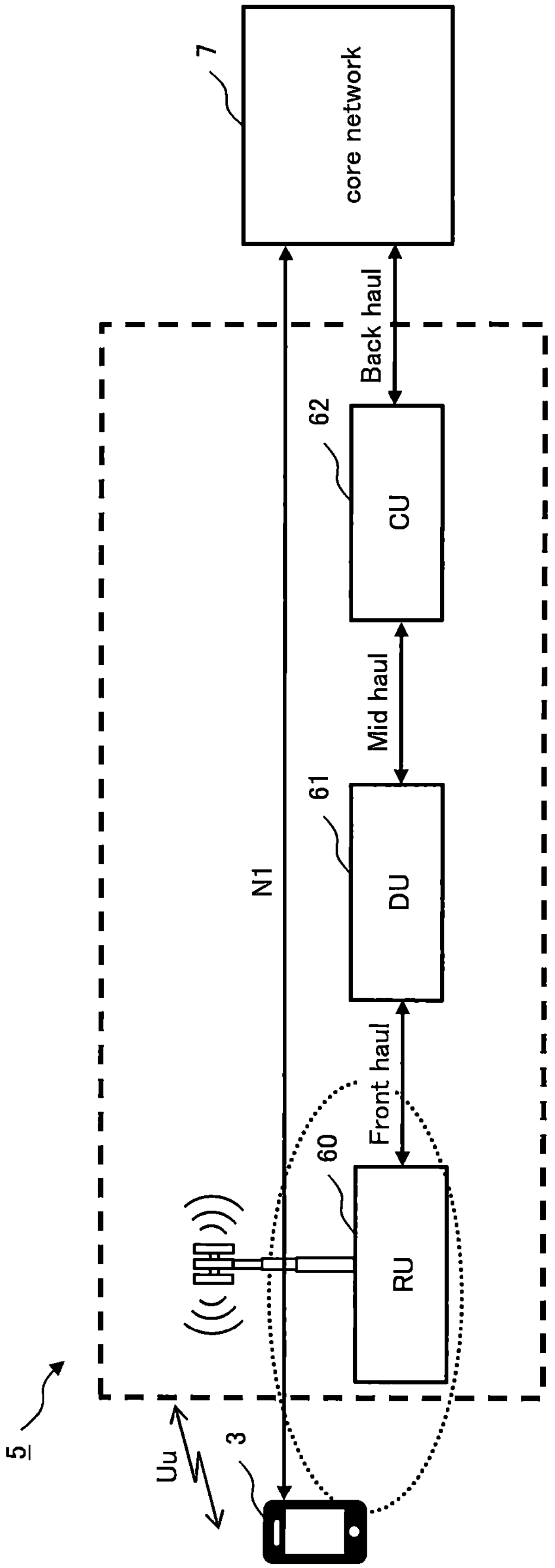
FIG. 10 illustrates System overview of (R)AN node 5 based on O-RAN architecture.

FIG. 10 schematically illustrates a (R)AN node 5 based on O-RAN architecture to which the (R)AN node 5 aspects are applicable.

The (R)AN node 5 based on O-RAN architecture represents a system overview in which the (R)AN node is split into a Radio Unit (RU) 60, Distributed Unit (DU) 61 and Centralized Unit (CU) 62. In some aspects, each unit may be combined. For example, the RU 60 can be integrated/combined with the DU 61 as an integrated/combined unit, the DU 61 can be integrated/combined with the CU 62 as another integrated/combined unit. Any functionality in the description for a unit (e.g. one of RU 60, DU 61 and CU 62) can be implemented in the integrated/combined unit above. Further, CU 62 can separate into two functional units such as CU Control plane (CP) and CU User plane (UP). The CU CP has a control plane functionality in the (R)AN node 5. The CU UP has a user plane functionality in the (R)AN node 5. Each CU CP is connected to the CU UP via an appropriate interface (such as the so-called "E1" interface and/or the like).

The UE 3 and a respective serving RU 60 are connected via an appropriate air interface (for example the so-called "Uu" interface and/or the like). Each RU 60 is connected to the DU 61 via an appropriate interface (such as the so-called "Front haul", "Open Front haul", "F1" interface and/or the like). Each DU 61 is connected to the CU 62 via an appropriate interface (such as the so-called "Mid haul", "Open Mid haul", "E2" interface and/or the like). Each CU 62 is also connected to nodes in the core network 7 (such as the so-called core network nodes) via an appropriate interface (such as the so-called "Back haul", "Open Back haul", "N2"/"N3" interface(s) and/or the like). In addition, a user plane part of the DU 61 can also be connected to the core network nodes 7 via an appropriate interface (such as the so-called "N3" interface(s) and/or the like).

Depending on functionality split among the RU 60, DU 61 and CU 62, each unit provides some of the functionality that is provided by the (R)AN node 5. For example, the RU 60 may provide a functionalities to communicate with a UE 3 over air interface, the DU 61 may provide functionalities to support MAC layer and RLC layer, the CU 62 may provide functionalities to support PDCP layer, SDAP layer and RRC layer.

<Radio Unit (RU)>

Figure 11:
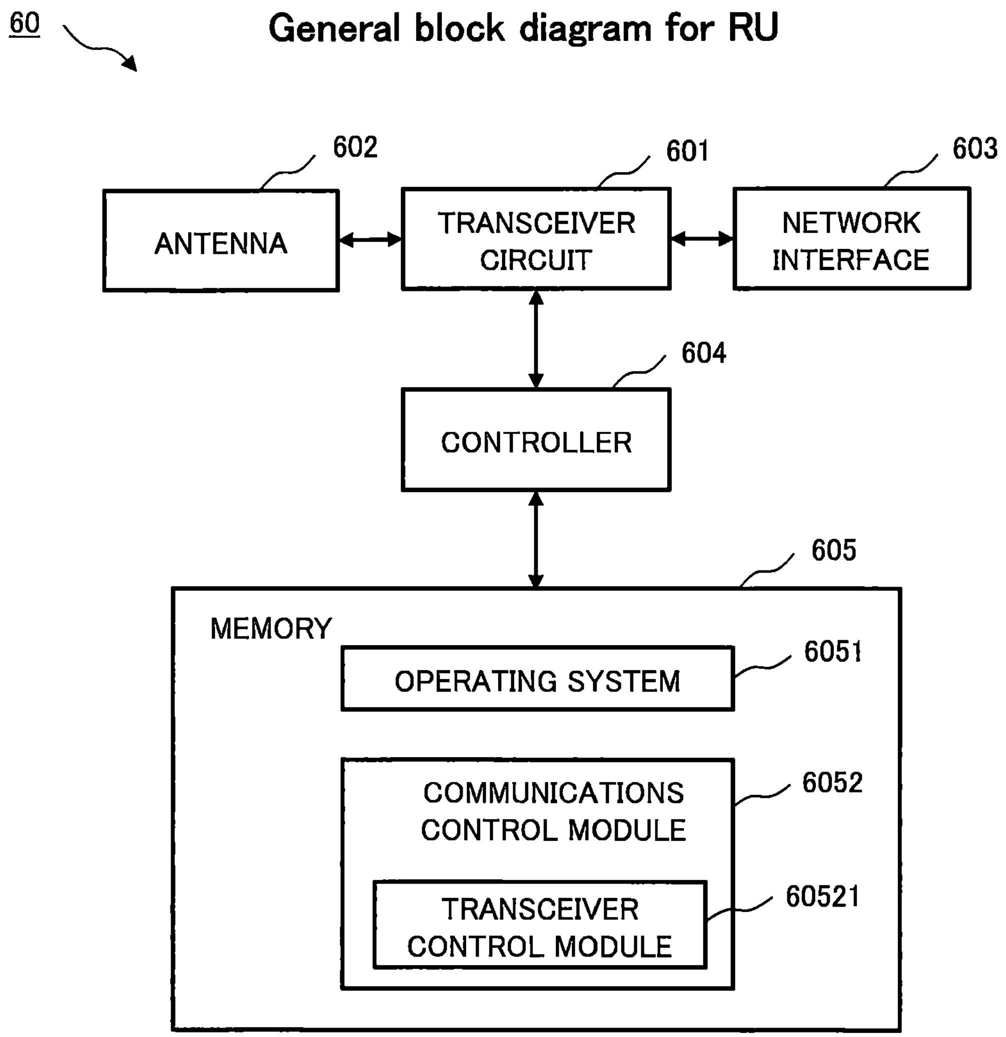
FIG. 11 is a block diagram for a Radio Unit (RU).

FIG. 11 is a block diagram illustrating the main components of an exemplary RU 60, for example a RU part of base station ('eNB' in LTE, 'gNB' in 5G, a base station for 5G beyond, a base station for 6G). As shown, the RU 60 includes a transceiver circuit 601 which is operable to transmit signals to and to receive signals from connected UE(s) 3 via one or more antennas 602 and to transmit signals to and to receive signals from other network nodes or network unit (either directly or indirectly) via a network interface 603. A controller 604 controls the operation of the RU 60 in accordance with software stored in a memory 605. Software may be pre-installed in the memory and/or may be downloaded via the telecommunication network or from a removable data storage device (RMD), for example. The software includes, among other things, an operating system 6051 and a communications control module 6052 having at least a transceiver control module 60521.

The communications control module 6052 (using its transceiver control sub-module) is responsible for handling (generating/sending/receiving) signalling between the RU 60 and other nodes or units, such as the UE 3, another RU 60 and DU 61 (e.g. directly or indirectly). The signalling may include, for example, appropriately formatted signalling messages relating to a radio connection and a connection with the RU 60 (for a particular UE 3), and in particular, relating to MAC layer and RLC layer.

The controller 604 is also configured (by software or hardware) to handle related tasks such as, when implemented, UE mobility estimate and/or moving trajectory estimation.

The RU 60 may support the Non-Public Network (NPN). The NPN may be a Stand-alone Non-Public Network (SNPN) or a Public Network Integrated NPN (PNI-NPN).

As described above, the RU 60 can be integrated/combined with the DU 61 as an integrated/combined unit.

Any functionality in the description for the RU 60 can be implemented in the integrated/combined unit above.

<Distributed Unit (DU)>

Figure 12:
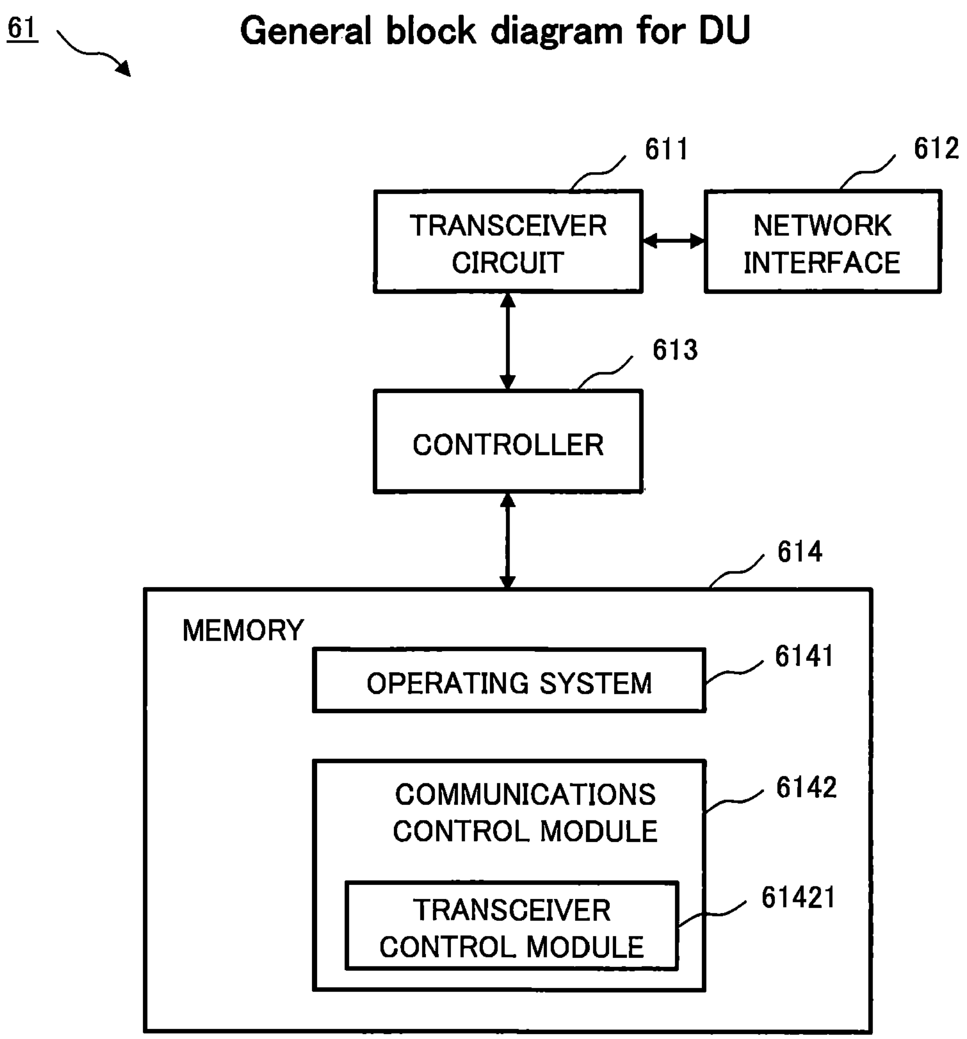
FIG. 12 is a block diagram for a Distributed Unit (DU).

FIG. 12 is a block diagram illustrating the main components of an exemplary DU 61, for example a DU part of a base station ('eNB' in LTE, 'gNB' in 5G, a base station for 5G beyond, a base station for 6G). As shown, the apparatus includes a transceiver circuit 611 which is operable to transmit signals to and to receive signals from other nodes or units (including the RU 60) via a network interface 612. A controller 613 controls the operation of the DU 61 in accordance with software stored in a memory 614. Software may be pre-installed in the memory 614 and/or may be downloaded via the telecommunication network or from a removable data storage device (RMD), for example. The software includes, among other things, an operating system 6141 and a communications control module 6142 having at least a transceiver control module 61421. The communications control module 6142 (using its transceiver control module 61421 is responsible for handling (generating/sending/receiving) signalling between the DU 61 and other nodes or units, such as the RU 60 and other nodes and units.

The DU 61 may support the Non-Public Network (NPN). The NPN may be a Stand-alone Non-Public Network (SNPN) or a Public Network Integrated NPN (PNI-NPN).

As described above, the RU 60 can be integrated/combined with the DU 61 or CU 62 as an integrated/combined unit. Any functionality in the description for DU 61 can be implemented in one of the integrated/combined unit above.

<Centralized Unit (CU)>

Figure 13:
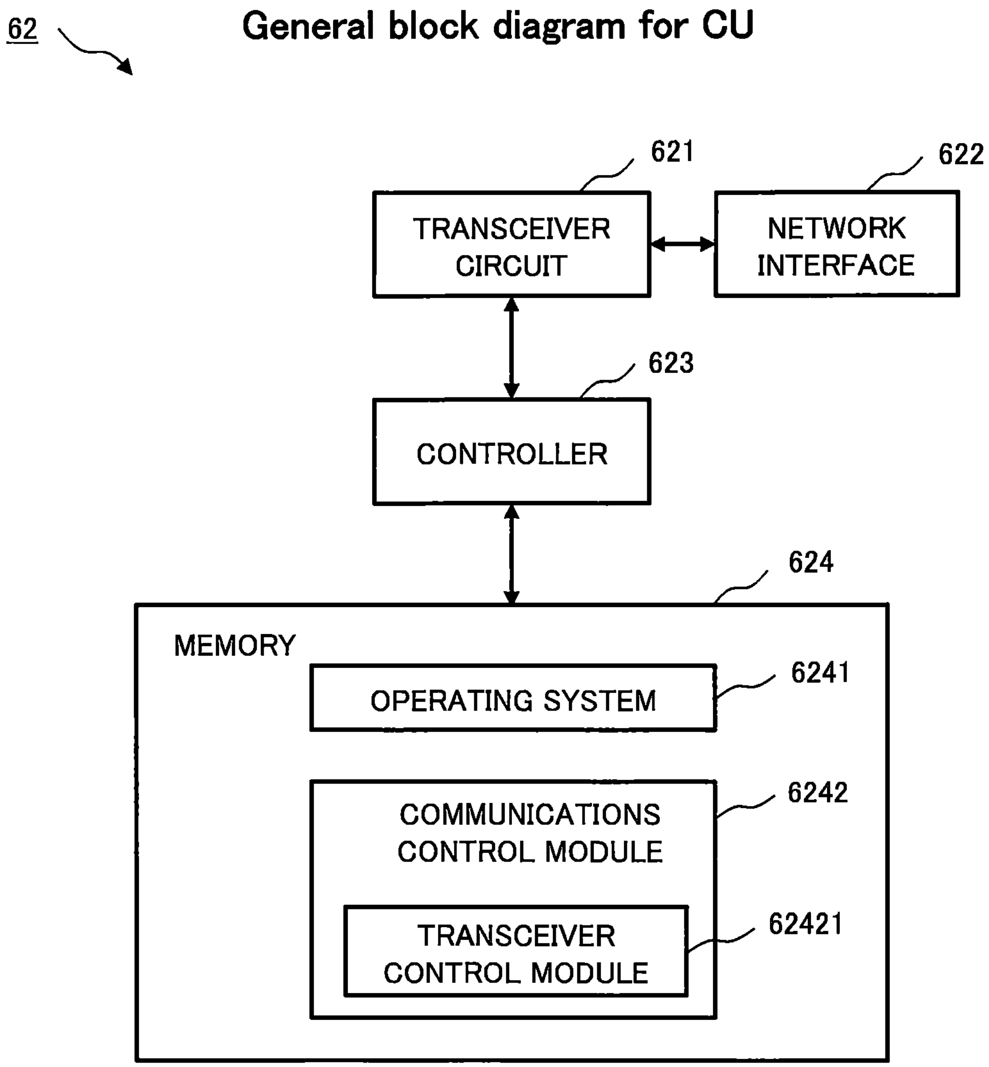
FIG. 13 is a block diagram for a Centralized Unit (CU).

FIG. 13 is a block diagram illustrating the main components of an exemplary CU 62, for example a CU part of base station ('eNB' in LTE, 'gNB' in 5G, a base station for 5G beyond, a base station for 6G). As shown, the apparatus includes a transceiver circuit 621 which is operable to transmit signals to and to receive signals from other nodes or units (including the DU 61) via a network interface 622. A controller 623 controls the operation of the CU 62 in accordance with software stored in a memory 624. Software may be pre-installed in the memory 624 and/or may be downloaded via the telecommunication network or from a removable data storage device (RMD), for example. The software includes, among other things, an operating system 6241 and a communications control module 6242 having at least a transceiver control module 62421. The communications control module 6242 (using its transceiver control module 62421 is responsible for handling (generating/sending/receiving) signalling between the CU 62 and other nodes or units, such as the DU 61 and other nodes and units.

The CU 62 may support the Non-Public Network (NPN). The NPN may be a Stand-alone Non-Public Network (SNPN) or a Public Network Integrated NPN (PNI-NPN).

As described above, the CU 62 can be integrated/combined with the DU 61 as an integrated/combined unit.

Any functionality in the description for the CU 62 can be implemented in the integrated/combined unit above.

<AMF>

Figure 14:
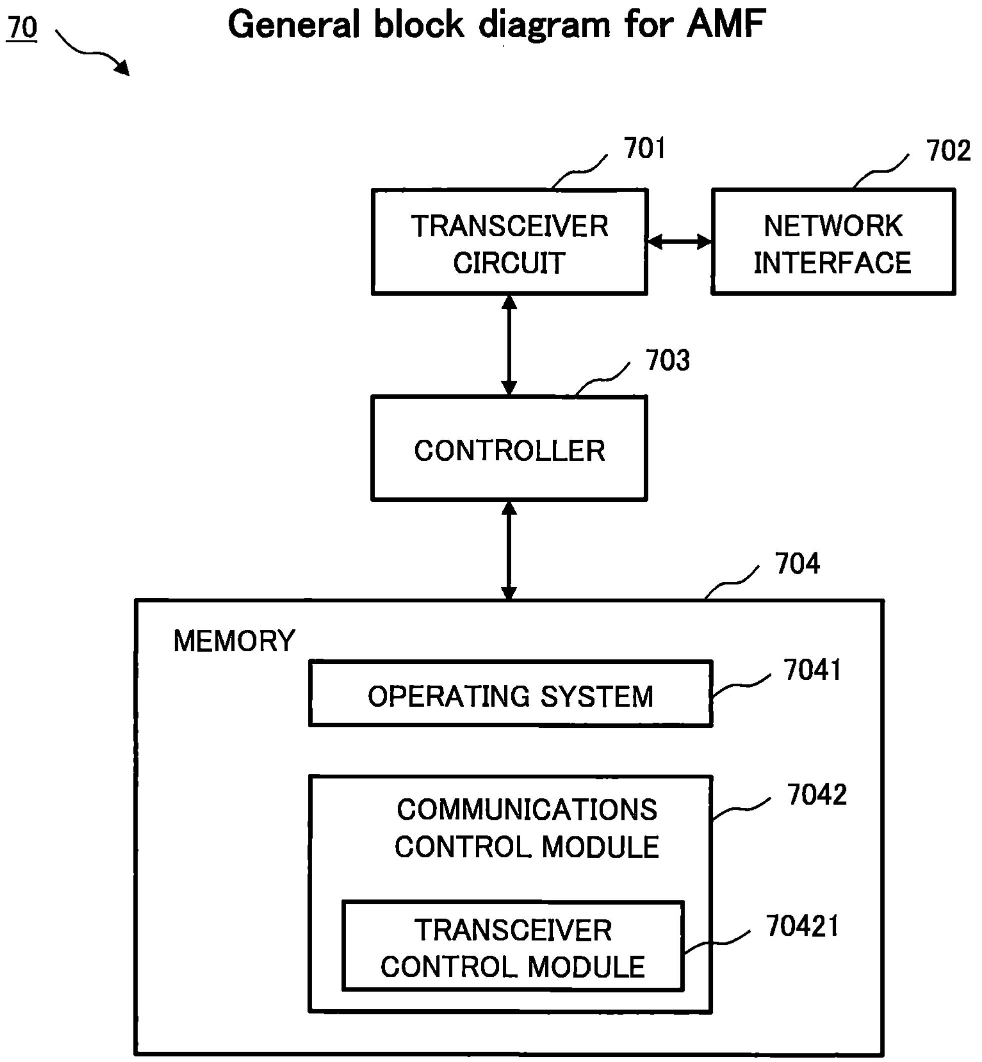
FIG. 14 is a block diagram for an AMF.

FIG. 14 is a block diagram illustrating the main components of the AMF 70. As shown, the apparatus includes a transceiver circuit 701 which is operable to transmit signals to and to receive signals from other nodes (including the UE 3) via a network interface 702. A controller 703 controls the operation of the AMF 70 in accordance with software stored in a memory 704. Software may be pre-installed in the memory 704 and/or may be downloaded via the telecommunication network or from a removable data storage device (RMD), for example. The software includes, among other things, an operating system 7041 and a communications control module 7042 having at least a transceiver control module 70421. The communications control module 7042 (using its transceiver control module 70421 is responsible for handling (generating/sending/receiving) signalling between the AMF 70 and other nodes, such as the UE 3 (e.g. via the (R)AN node 5) and other core network nodes (including core network nodes in the HPLMN of the UE 3 when the UE 3 is roaming-in. Such signalling may include, for example, appropriately formatted signalling messages (e.g. a registration request message and associated response messages) relating to access and mobility management procedures (for the UE 3).

The AMF 70 may support the Non-Public Network (NPN). The NPN may be a Stand-alone Non-Public Network (SNPN) or a Public Network Integrated NPN (PNI-NPN).

<SMF>

Figure 15:
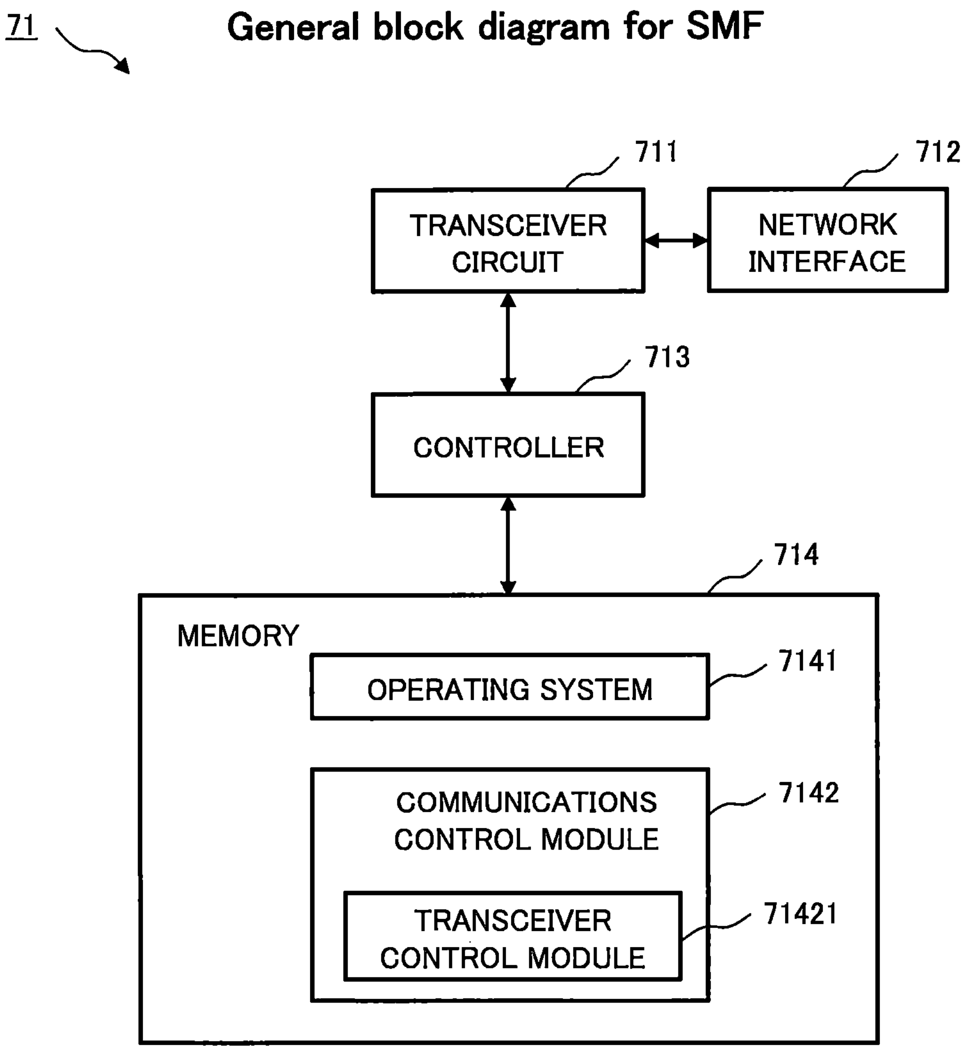
FIG. 15 is a block diagram for an SMF.

FIG. 15 is a block diagram illustrating the main components of the SMF 71. As shown, the apparatus includes a transceiver circuit 711 which is operable to transmit signals to and to receive signals from other nodes (including the AMF 70) via a network interface 712. A controller 713 controls the operation of the SMF 71 in accordance with software stored in a memory 714. Software may be pre-installed in the memory 714 and/or may be downloaded via the telecommunication network or from a removable data storage device (RMD), for example. The software includes, among other things, an operating system 7141 and a communications control module 7142 having at least a transceiver control module 71421. The communications control module 7142 (using its transceiver control module 71421 is responsible for handling (generating/sending/receiving) signalling between the SMF 71 and other nodes, such as the UPF 72 and other core network nodes (including core network nodes in the HPLMN of the UE 3 when the UE 3 is roaming-in. Such signalling may include, for example, appropriately formatted signalling messages (e.g. a Hypertext Transfer Protocol (HTTP) restful methods based on the service based interfaces) relating to session management procedures (for the UE 3).

The SMF 71 may support the Non-Public Network (NPN). The NPN may be a Stand-alone Non-Public Network (SNPN) or a Public Network Integrated NPN (PNI-NPN).

Note that SMF+PGW-C may have same components to the SMF 71. In addition, the SMF+PGW-C has function of the PGW-C. The function of the PGW-C can be achieved by the components of the SMF+PGW-C.

<UDM>

Figure 16:
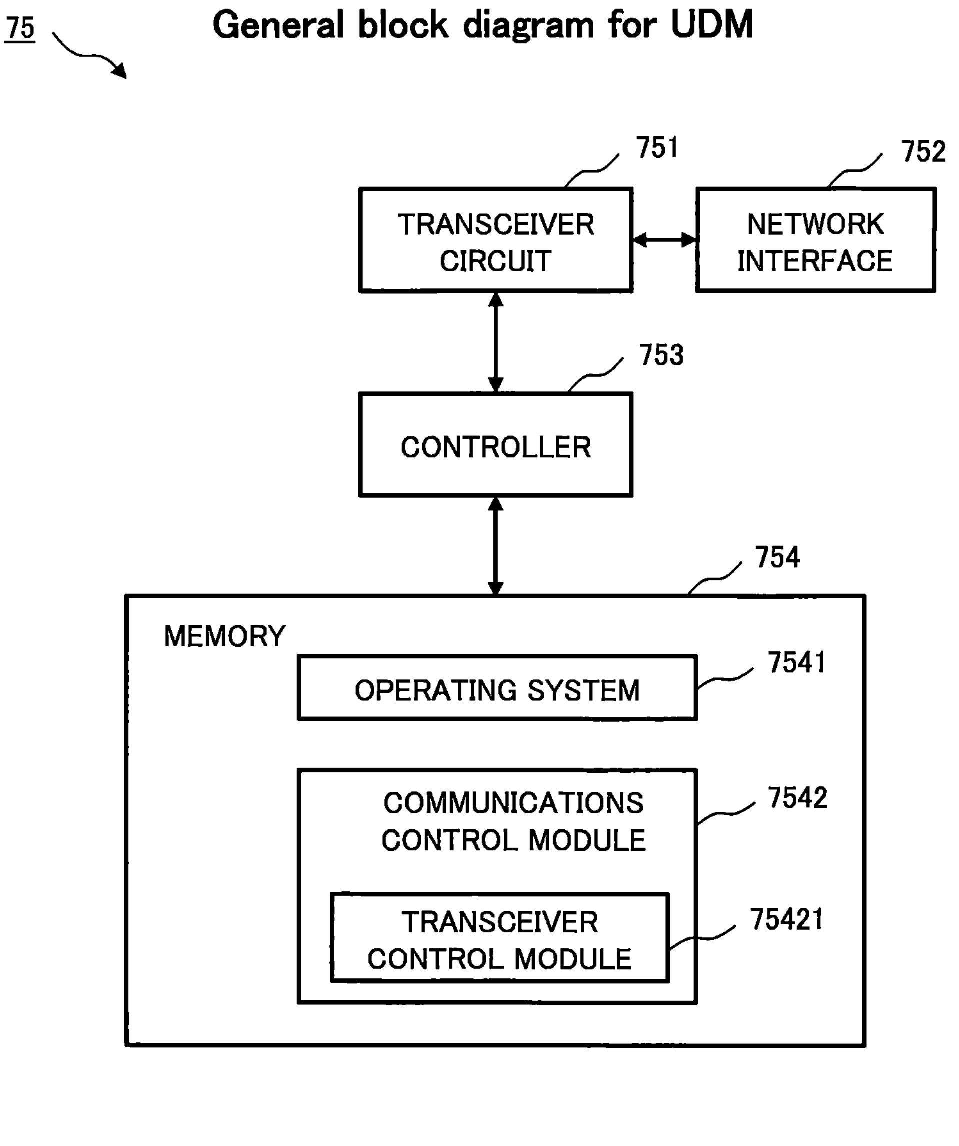
FIG. 16 is a block diagram for a UDM.

FIG. 16 is a block diagram illustrating the main components of the UDM 75. As shown, the apparatus includes a transceiver circuit 751 which is operable to transmit signals to and to receive signals from other nodes (including the AMF 70) via a network interface 752. A controller 753 controls the operation of the UDM 75 in accordance with software stored in a memory 754. Software may be pre-installed in the memory 754 and/or may be downloaded via the telecommunication network or from a removable data storage device (RMD), for example. The software includes, among other things, an operating system 7541 and a communications control module 7542 having at least a transceiver control module 75421. The communications control module 7542 (using its transceiver control module 75421 is responsible for handling (generating/sending/receiving) signalling between the UDM 75 and other nodes, such as the AMF 70 and other core network nodes (including core network nodes in the VPLMN of the UE 3 when the UE 3 is roaming-out. Such signalling may include, for example, appropriately formatted signalling messages (e.g. a HTTP restful methods based on the service based interfaces) relating to mobility management procedures (for the UE 3).

The UDM 75 may support the Non-Public Network (NPN). The NPN may be a Stand-alone Non-Public Network (SNPN) or a Public Network Integrated NPN (PNI-NPN).

<NSACF>

Figure 17:
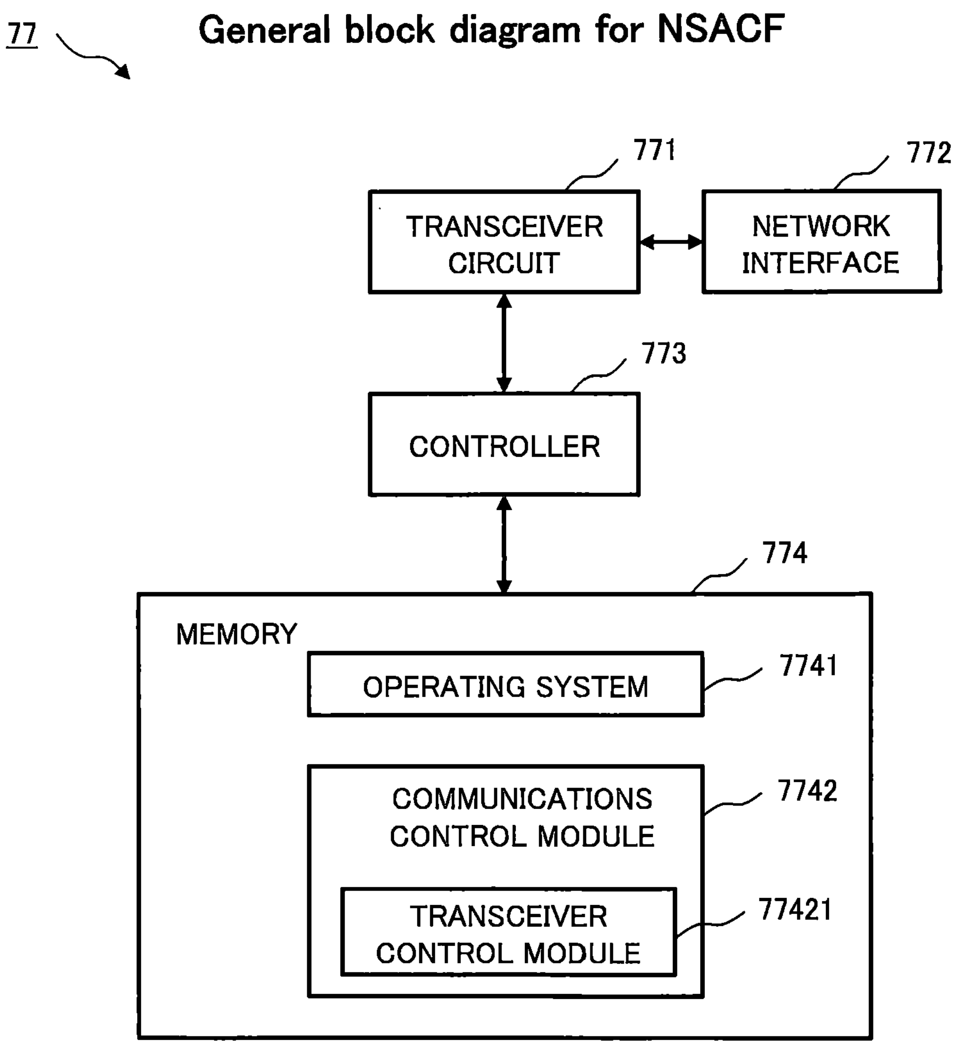
FIG. 17 is a block diagram for an NSACF.

FIG. 17 is a block diagram illustrating the main components of the NSACF 77. As shown, the apparatus includes a transceiver circuit 771 which is operable to transmit signals to and to receive signals from other nodes (including the AMF 70 and SMF 71) via a network interface 772. A controller 773 controls the operation of the NSACF 77 in accordance with the software stored in a memory 774. The Software may be pre-installed in the memory 774 and/or may be downloaded via the telecommunication network or from a removable data storage device (RMD), for example. The software includes, among other things, an operating system 7741 and a communications control module 7742 having at least a transceiver control module 77421. The communications control module 7742 (using its transceiver control module 77421 is responsible for handling (generating/sending/receiving) signalling between the NSACF 77 and other nodes, such as the AMF 70 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to network data analytics function procedures (for the UE 3).

The NSACF 77 may support the Non-Public Network (NPN). The NPN may be a Stand-alone Non-Public Network (SNPN) or a Public Network Integrated NPN (PNI-NPN).

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE 3 and the network apparatus are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE 3 and the network apparatus as a signal over a computer network, or on a recording medium. Further, the functionality performed by part or all of this software may be performed using one or more dedicated hardware circuits. However, the use of software modules is preferred as it facilitates the updating of the UE 3 and the network apparatus in order to update their functionalities.

In the above aspects, a 3GPP radio communications (radio access) technology is used. However, any other radio communications technology (e.g. WLAN, Wi-Fi, WiMAX, Bluetooth, etc.) and other fix line communications technology (e.g. BBF Access, Cable Access, optical access, etc.) may also be used in accordance with the above aspects.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

The whole or part of the example Aspects disclosed above can be described as, but not limited to, the following.

<5.15.11.14 Support of Network Slice Admission Control and Interworking with EPC>

If EPS counting is required for a network slice, the Network Slice Admission Control for maximum number of UEs and/or for maximum number of PDU Sessions per network slice is performed at the time of PDN connection establishment in case of EPC interworking. To support the NSAC for maximum number of UEs and/or for maximum number of PDU Sessions per network slice in EPC, the SMF+PGW-C is configured with the information indicating which network slice is subject to NSAC. During PDN connection establishment in EPC, the SMF+PGW-C selects an S-NSSAI associated with the PDN connection as described in clause 5.15.7.1. If the selected S-NSSAI by the SMF+PGW-C is subject to the NSAC, the SMF+PGW-C triggers interaction with NSACF to check the availability of the network slice, before the SMF+PGW-C provides the selected S-NSSAI to the UE. If the network slice is available, the SMF+PGW-C continues to proceed with the PDN connection establishment procedure.

The NSACF performs the following for checking network slice availability prior to returning a response to the SMF+PGW-C:

If:

- the UE identity is already included in the list of UE IDs registered with a network slice (if Network Slice Admission Control for maximum number of UEs is applicable) and the current number of PDU sessions is below the maximum number (if Network Slice Admission Control for maximum number of sessions is applicable); or
- the UE identity is not included in the list of UE IDs registered with a network slice and the current number of UE registration did not reach the maximum number (if Network Slice Admission Control for maximum number of UEs is applicable), and the current number of PDU sessions did not reach the maximum number (if Network Slice Admission Control for maximum number of sessions is applicable);
- then the NSACF responds to the SMF+PGW-C with the information that the network slice is available. The NSACF includes the UE identity in the list of UE IDs if not already on the list and increases the current number of UE registration (if Network Slice Admission Control for maximum number of UEs is applicable) and increases the current number of PDU sessions (if Network Slice Admission Control for maximum number of sessions is applicable).

When the UE with ongoing PDN connection(s) moves from EPC to 5GC, the SMF+PGW-C triggers a request to decrease the number of the UE registration in NSACF and the AMF triggers a request to increase the number of the UE registration in NSACF when the UE is registered in the new AMF. If there are more than one PDN connections associated with the S-NSSAI, the NSACF may receive multiple requests for the same S-NSSAI from different SMF+PGW-Cs. When the UE with ongoing PDU session(s) moves from 5GC to EPC, the SMF+PGW-C triggers a request to increase the number of the UE registration in NSACF and the old AMF triggers a request to decrease the number of the UE registration in NSACF when the UE is deregistered in old AMF. If there are more than one PDU sessions associated with the S-NSSAI, the NSACF may receive multiple requests for the same S-NSSAI from different SMF+PGW-Cs. The NSACF maintains a list of UE IDs based on the requests from SMF+PGW-C(s) and AMF, and adjusts the current number of registrations accordingly.

When the UE with ongoing PDN connection(s) moves from EPC to 5GC, or from 5GC to EPC, the session continuity is guaranteed as the admission was granted at the time of PDN connection establishment, i.e. the number of PDU session is not counted again in 5GC.

Editor's note: NSAC mechanism during the mobility between EPC and 5GC can be revisited to make it align with 5GC mechanism, i.e. mobility between AMFs.

If the PDN connection associated with S-NSSAI is released in EPC, the SMF+PGW-C triggers a request (i.e. decrease) to NSACF for maximum number of PDU sessions per network slice control. The NSACF determines to decrease the current number of registrations and remove the UE identity from the list of UE IDs if the PDN connection(s) associated with S-NSSAI are all released in EPC.

Editor's note: It is FFS whether one NSACF is in charge of registration and session admission control, or there are respective NSCAFs for registration and session admission control, depending on the deployment scenarios.

NOTE: Network Slice Admission Control in EPC is not performed for the attachment without PDN connectivity.

If EPS counting is not required for a network slice, the Network Slice Admission Control for maximum number of UEs and/or for maximum number of PDU Sessions per network slice is performed when the UE moves from EPC to 5GC, i.e. when the UE performs mobility Registration procedure from EPC to 5GC (Network Slice Admission Control for maximum number of UEs per network slice) and/or when the PDN connections are handed over from EPC to 5GC (Network Slice Admission Control for maximum number of PDU Sessions per network slice). The SMF+PGW-C is configured with the information indicating the network slice is subject to NSAC only in 5GS. The PDN connection interworking procedure is performed as described in clause 5.15.7.1.

If the NSAC is not supported in EPS and the EPS to 5GS handover takes place, the NSACF shall not reject the registration of the UE even if the maximum number of the registered UEs with the network slice in 5GS has been reached or has been exceeded unless the number of the registered UEs has reached an overflow threshold, if one is configured in the NSACF by the operator. Similarly, the NSACF shall not reject the registration of the PDU Session even if the maximum number of the registered PDU Sessions with the network slice in 5GS has been reached or has been exceeded unless the number of the registered PDU Sessions has reached an overflow threshold, if one is configured in the NSACF by the operator.

<4.2.11.2 Number of UEs Per Network Slice Availability Check and Update Procedure>

The number of UEs per network slice availability check and update procedure is to update (i.e. increase or decrease) the number of UEs registered with a S-NSSAI which is subject to NSAC. The AMF is configured with the information indicating which network slice is subject to NSAC.

Figure 18:
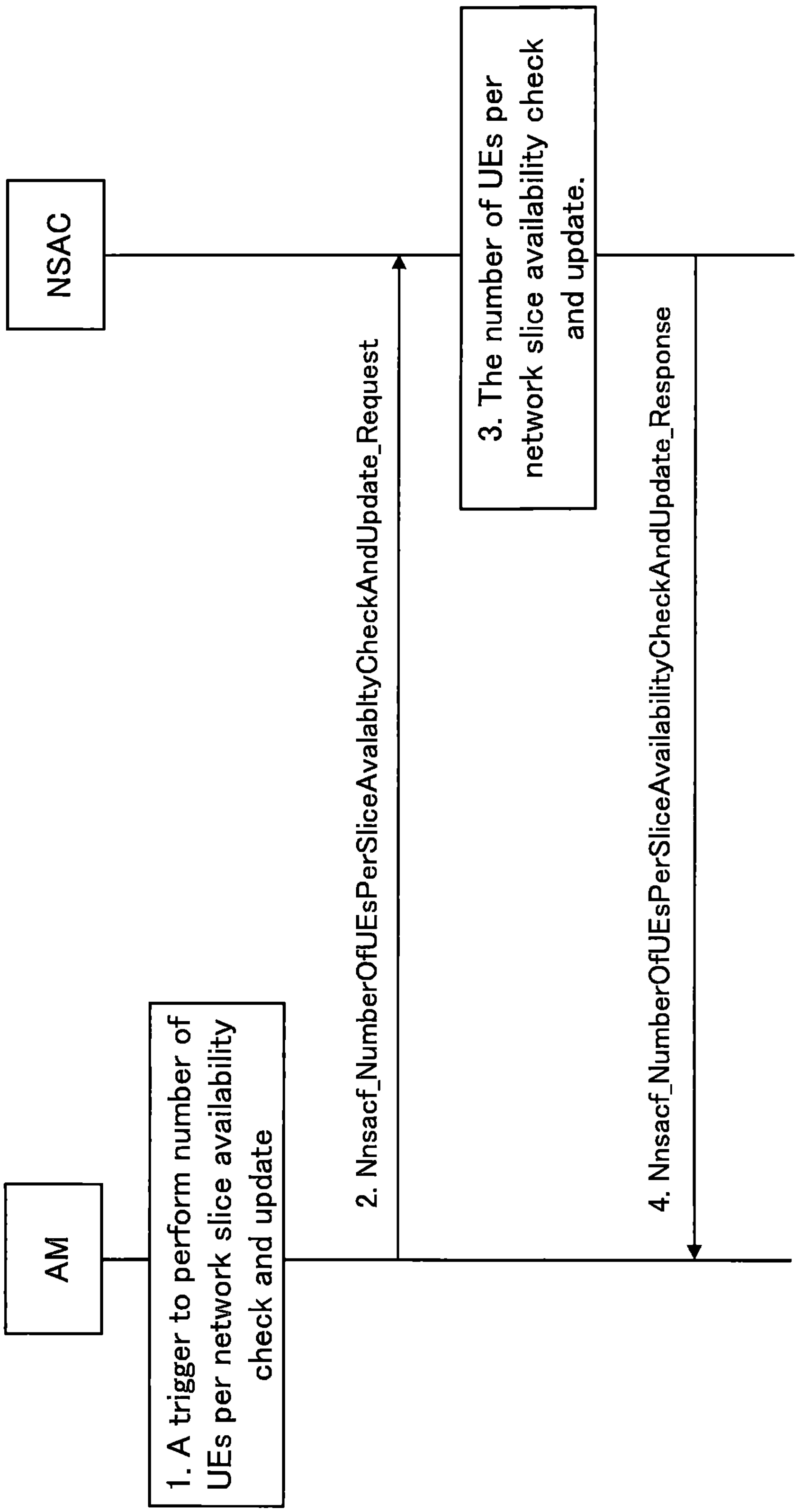
FIG. 18 illustrates Number of UEs per network slice availability check and update procedure.

FIG. 4.2.11.2-1: Number of UEs per network slice availability check and update procedure (See FIG. 18)

1. If the AMF is not aware of which NSACF to communicate, the AMF performs NSACF discovery as described in clause 6.3.22 of TS 23.501 [2] and in clause 5.2.7.3.2. The AMF triggers the Number of UEs per network slice availability check and update procedure to update the number of UEs registered with a network slice when a network slice subject to NSAC is included in the Allowed NSSAI (i.e. the AMF requests to register the UE with the S-NSSAI) or removed from the Allowed NSSAI for a UE. The trigger event at the AMF also includes the change of Allowed NSSAI in case of inter-AMF mobility. The procedure is triggered in the following cases:

- At UE Registration procedure, according to clause 4.2.2.2.2 (including Registration types of Initial Registration or Mobility Registration Update in inter-AMF mobility in CM-CONNECTED or CM-IDLE state):
  - before the Registration Accept in step 21 if the EAC mode is active; or
  - after the Registration Accept message if the EAC mode is not active;
- At UE Deregistration procedure, as per clause 4.2.2.3, after the Deregistration procedure is completed;
- At UE Configuration Update procedure (which may result from NSSAA procedure or subscribed S-NSSAI change):
  - before the UE Configuration Update message if the EAC mode is active; or
  - after the UE Configuration Update message if the EAC mode is not active;

NOTE 1: Depending on the deployment, there may be different NSACF for different S-NSSAI subject to NSAC, and hence, during the registration, AMF triggers the Number of UEs per network slice availability check and update procedure to multiple NSACFs.

2. The AMF sends Nnsacf_NumberOfUEsPerSlice Availability Check AndUpdate_Request message to the NSACF. The AMF includes in the message the UE ID, access type, the S-NSSAI(s) and the update flag which indicates whether the number of UEs registered with the S-NSSAI(s) is to be increased when the UE has gained registration to network slice(s) subject to NSAC or the number of UEs registered with the S-NSSAI(s) is to be decreased when the UE has deregistered from S-NSSAI(s) or could not renew its registration to an S-NSSAI subject to NSAC.

3. The NSACF updates the current number of UEs registered for the S-NSSAI, i.e. increases or decrease the number of UEs registered per network slice based on the information provided by the AMF in the update flag parameter.

If the update flag parameter from the AMF indicates increase, the following applies:

- If the UE ID is already in the list of UEs registered with the network slice, the current number of UEs is not increased as the UE has already been counted as registered with the network slice. The NSACF creates a new entry associated with this new update and shall also temporarily maintains the old entry associated with previous update. The NSACF removes the old entry upon reception of a request having update flag indicating decrease.

NOTE 2: The use case of having two entries temporarily in the NSACF for the same UE can happen during inter-AMF mobility when there is no UE context transfer and the UE requests to register with S-NSSAI(s) subject to NSAC already used in the old AMF. The old entry in the NSACF is removed by the old AMF.

- If the UE ID is not in the list of UE IDs registered with the network slice and the maximum number of UEs registered with the network slice has not been reached yet, the NSACF adds the UE ID in the list of UEs registered with the network slice and increases the current number of the UEs registered with the network slice. If the UE ID is not in the list of UEs registered with that S-NSSAI and the maximum number of UEs for that S-NSSAI has already been reached, then the NSACF returns a result parameter indicating that the maximum number of UEs registered with the network slice has been reached.

If the update flag parameter from the AMF indicates decrease and if there is only one entry associated with the UE ID, the NSACF removes the UE ID from the list of UEs registered with the network slice for each of the S-NSSAI(s) indicated in the request from the AMF and also the NSACF decreases the number of UEs per network slice that is maintained by the NSACF for each of these network slices. If there are two entries associated with the UE ID, the NSACF removes the old entry and keeps the new entry.

The NSACF takes access type into account for increasing and decreasing the number of UEs per network slice as described in clause 5.15.11.1 of TS 23.501 [2].

If the EPS to 5GS handover parameter is included and the NSAC support in the EPS parameter indicates that NSAC is not supported in EPS, the NSACF shall not reject the registration of the UE even if the maximum number of the registered UEs with the network slice in 5GS has been reached or has been exceeded unless the number of the registered UEs has reached an overflow threshold, if one is configured in the NSACF by the operator.

4. The NSACF returns the Nnsacf_NumberOfUEs-PerSlice Availability Check AndUpdate_Response in which the NSACF includes the S-NSSAI(s) for which the maximum number of UEs per network slice has already been reached along with a result parameter indicating that the maximum number of UEs registered with the network slice has been reached.

At UE Registration procedure, if only some of the S-NSSAIs reached the maximum number of UEs per S-NSSAI, the AMF sends a Registration Accept message to the UE in which the AMF includes the rejected S-NSSAI(s) in the rejected NSSAI list for which the NSACF has indicated that the maximum number of UEs per network slice has been reached, and for each rejected S-NSSAI the AMF includes a reject cause set to 'maximum number of UEs per network slice reached' and optionally a back-off timer.

When for all the Requested S-NSSAI(s) provided in step 2 the NSACF returned the maximum number of UEs per network slice has been reached and if one or more subscribed S-NSSAIs are marked as default in the subscription data and not subject to Network Slice Admission Control, the AMF can decide to include these Default Subscribed S-NSSAIs in the Allowed NSSAI. Otherwise, the AMF rejects the UE request for registration. In the Registration Reject message the AMF includes the rejected S-NSSAI(s) in the rejected NSSAI parameter, and for each rejected S-NSSAI the AMF includes a reject cause to indicate that the maximum number of UEs per network slice has been reached and optionally a back-off timer.

NOTE 3: If the use case requires the UE to remain reachable at all times with at least one slice, it is recommended that at least one of the Subscribed S-NSSAIs is marked as the default S-NSSAI which is not subject to Network Slice Admission Control. This will ensure the UE is able to access to services even when maximum number of UEs per network slice has been reached.

Editor's note: It is FFS whether and how to restrict the signalling sent from the AMFs to the NSACF in case the maximum number of UEs has been reached for prolonged time.

<4.2.11.4 Number of PDU Sessions Per Network Slice Availability Check and Update Procedure>

The number of PDU Sessions per network slice availability check and update procedure is to update (i.e. increase or decrease) the number of PDU Sessions established on S-NSSAI which is subject to NSAC. The SMF is configured with the information indicating which network slice is subject to NSAC.

Figure 19:
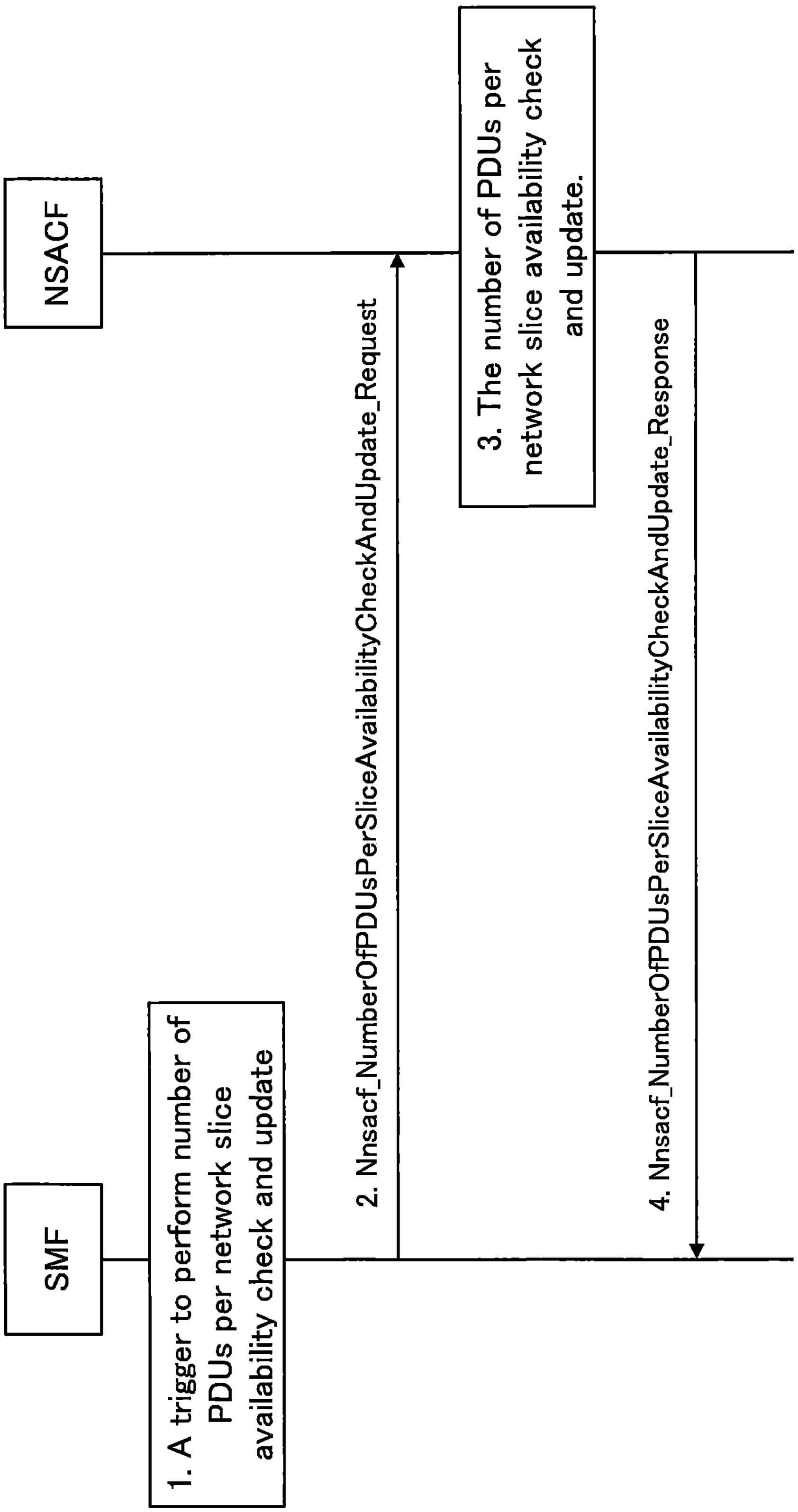
FIG. 19 illustrates Number of PDU Sessions per network slice availability check and update procedure.

FIG. 4.2.11.4-1: Number of PDU Sessions per network slice availability check and update procedure (See FIG. 19)

1. The SMF triggers the Number of PDU Sessions per network slice availability check and update procedure for the network slices that are subject to NSAC at the beginning of a PDU Session Establishment procedure (clause 4.3.2.2.1 and clause 4.3.2.2.2) and as a last step of successful PDU Session Release procedure (clause 4.3.4.2 and clause 4.3.4.3).

2. The SMF sends Nnsacf_NumberOfPDUsPerSlice Availability Check AndUpdate_Request message to the NSACF. The SMF includes in the message the S-NSSAI for which the number of PDU Sessions per network slice update is required and the update flag which indicates that the number of PDUs established on the S-NSSAI is to be increased if the procedure is triggered at the beginning of PDU Session Establishment procedure or indicates that the number of PDU Sessions on the S-NSSAI is to be decreased if the procedure is triggered at the end of PDU Sessions Release procedure.

3. The NSACF updates the current number of PDU Sessions established on the S-NSSAI, i.e. increase or decrease the number of PDU Sessions per network slice based on the information provided by the SMF in the update flag parameter.

If the update flag parameter from the SMF indicates increase the current number of PDU Sessions per network slice and the maximum number of PDU Sessions established on the network slice has not been reached yet, the NSACF increases the number of PDU Sessions for that network slice. If the maximum number of PDU Sessions established on the network slice has already been reached, then the NSACF returns a result parameter indicating that the maximum number of PDU Sessions per network slice has been reached.

If the update flag parameter from the SMF indicates decrease the current number of PDU Sessions per network slice, the NSACF decreases the number of PDU Sessions for that network slice.

If the EPS to 5GS handover parameter is included and the NSAC support in the EPS parameter indicates that NSAC is not supported in EPS, the NSACF shall not reject the registration of the PDU Session even if the maximum number of the registered PDU Sessions with the network slice in 5GS has been reached or has been exceeded unless the number of the registered PDU Sessions has reached an overflow threshold, if one is configured in the NSACF by the operator.

4. The NSACF acknowledges the update to the SMF with Nnsacf_NumberOfPDUsPerSlice Availability Check And-Update_Response message. If the NSACF returned maximum number of PDU Sessions per network slice reached result, the SMF rejects the PDU Session establishment request with maximum number of PDU Sessions per network slice reached reject cause.

In the case of a PDU Session Establishment failure, the SMF triggers another request to the NSACF with the update flag parameter equal to decrease in order to re-adjust back the PDU Session counter in the NSACF.

Editor's note: It is FFS how to achieve high admission control accuracy.

Editor's note: Whether SMF or AMF interacts with the NSACF is FFS.

<5.2.21.2.2 Nnsacf_NumberOfUEsPerSlice Availability-CheckAndUpdate Service Operation>

Service Operation name: Nnsacf_NumberOfUEsPerSlice AvailabilityCheckAndUpdate

Description: Updates the number of UEs registered with a network slice (e.g. increase or decrease) when the UE registration status for a network slice subject to NSAC has changed. Also, if the number of the UEs registered with the network slice is to be increased and the Early Availability Check (EAC) mode in the NSACF is activated for that network slice (see Nnsacf_NumberOfUEsPerSliceEACNotify service operation), the NSACF first checks whether the number of UEs registered with the network slice has reached the maximum number of UEs per network slice threshold. If the maximum number of UEs registered with the network slice has already been reached, the UE registration for that network slice is rejected. If the EAC is not activated, the NSACF increases or decreases the number of UEs per network slice as per the input parameters below.

Inputs, Required: S-NSSAI(s), UE ID (SUPI), access type, update flag.

The S-NSSAI(s) parameter is a list of one or more network slices for which the number of UEs registered with a network slice is to be updated and checked if the maximum number of UEs per network slice threshold has already been reached.

The UE ID is used by the NSACF to maintain a list of UE IDs registered with the network slice. The NSACF also takes access type into account for increasing and decreasing the number of UEs per network slice as described in clause 5.15.11.1 of TS 23.501 [2].

The update flag input parameter indicates whether the number of UEs registered with a network slice is to be:

- increased when the UE registers to a new network slice subject to NSAC. If the UE ID is already in the list of UEs registered with the network slice, the number of UEs registered with the network slice is not increased as the UE has already been counted as registered with the network slice. If the UE ID is not in the list of UE IDs registered with the network slice and the maximum number of UEs registered with the network slice has not been reached yet, the NSACF adds the UE ID in the list of UEs registered with the network slice and increases the number of the UEs registered with the network slice. If the UE_ID is not in the list of UEs registered with that S-NSSAI and the maximum number of UEs per network slice for that S-NSSAI has already been reached, then the NSACF returns maximum number of UEs per network slice reached result;
- decreased when the UE deregisters for a network slice that is subject to NSAC. The NSACF decreases the number of the UEs registered with the network slice and removes the UE ID from the list of UEs registered with the network slice.

Inputs, Optional: EPS to 5GS handover, NSAC support in EPS

The EPS to 5GS handover parameter indicates that the UE is in process of handover from EPS.

The NSAC support in EPS parameter indicates whether the NSAC is supported or not in EPS.

The NSACF may optionally return the current status of the network slice availability (e.g. a percentage out of the max number of UEs registered with a network slice) in the availability status parameter. This information may be used for NSACF signalling and load balancing in case multiple NSACFs are serving the same network slice.

Editor's note: It is FFS how to support in case multi NSACF is supported, e.g. discover the same NSACF, coordination of the local maximum number among NSACF.

Outputs, Required: maximum number of UEs per network slice reached, availability status.

<5.2.21.3.2 Nnsacf_NumberOfPDUsPerSlice Availability Check AndUpdate Service Operation>

Service Operation name: Nnsacf_NumberOfPDUsPerSliceAvailability CheckAndUpdate

Description: Updates the number of PDU Sessions established on a network slice (e.g. increase or decrease). Also, if the number of PDU Sessions on the network slice is to be increased, the NSACF first checks whether the number of the PDU Sessions on that network slice has reached the maximum number of PDU Sessions per network slice threshold. If the maximum number of PDU Sessions on the network slice has already been reached, the PDU Session Establishment procedure is rejected.

Inputs, Required: S-NSSAI, update flag.

The S-NSSAI parameter is the network slice for which the number of PDU Sessions established on a network slice is to be updated.

The update flag input parameter indicates whether the number of the PDU Sessions established on that network slice is to be increased, for example at PDU Session Establishment procedure or decreased, for example at PDU Session Release procedure.

Inputs, Optional: EPS to 5GS handover, NSAC support in EPS

The EPS to 5GS handover parameter indicates that the UE is in process of handover from EPS.

The NSAC support in EPS parameter indicates whether the NSAC is supported or not in EPS.

Outputs, Required: maximum number of PDU Sessions per network slice reached, availability status While the disclosure has been particularly shown and described with reference to exemplary Aspects thereof, the disclosure is not limited to these Aspects. It will be understood by those of ordinary skill in the art that various changes in form and details may be made therein without departing from the spirit and scope of the present disclosure as defined by this document. For example, the Aspects above are not limited to 5GS, and the Aspects are also applicable to communication system other than 5GS.

The whole or part of the example Aspects disclosed above can be described as, but not limited to, the following supplementary notes.

supplementary note 1. A method of a Session Management Function (SMF) apparatus comprising:

- communicating with a Network Slice Admission Control Function (NSACF) apparatus; and
- sending a message to the NSACF apparatus for a Network Slice Admission Control (NSAC),
- wherein the message includes information related to a handover from Evolved Packet System (EPS) to 5th Generation System (5GS) and information indicating the NSAC is not supported in the EPS.

supplementary note 2. A method of a Network Slice Admission Control Function (NSACF) apparatus comprising:

- receiving a message from a Session Management Function (SMF) apparatus,
- wherein the message includes first information related to a handover from Evolved Packet System (EPS) to 5th Generation System (5GS) and second information indicating a Network Slice Admission Control Function (NSAC) is not supported in the EPS; and
- accepting a PDU Session related to the handover in a case where the number of PDU Sessions on the 5GS reaches to a predetermined threshold value and the message includes the first information and the second information.

supplementary note 3. A method of an Access and Mobility Management Function (AMF) apparatus comprising:

- communicating with a Network Slice Admission Control Function (NSACF) apparatus; and
- sending a message to the NSACF apparatus for a Network Slice Admission Control (NSAC), wherein the message includes information related to a handover from Evolved Packet System (EPS) to 5th Generation System (5GS) and information indicating the NSAC is not supported in the EPS.

supplementary note 4. A method of a Network Slice Admission Control Function (NSACF) apparatus comprising:

receiving a message from an Access and Mobility Management Function (AMF) apparatus, wherein the message includes first information related to a handover from Evolved Packet System (EPS) to 5th Generation System (5GS) and second information indicating a Network Slice Admission Control Function (NSAC) is not supported in the EPS; and accepting a registration of a User Equipment (UE) related to the handover in a case where the number of UEs registered on 5GS reaches to a predetermined threshold value and the message includes the first information and the second information.

supplementary note 5. A method of an apparatus related to Session Management Function (SMF) comprising:

communicating with a Network Slice Admission Control Function (NSACF) apparatus; and sending a message to the NSACF apparatus for a Network Slice Admission Control (NSAC), wherein the message includes information related to Radio Access Technology (RAT) of a User Equipment (UE).

supplementary note 6. A method of a Session Management Function (SMF) apparatus comprising:

communicating with a Network Slice Admission Control Function (NSACF) apparatus; and sending a message to the NSACF apparatus for a Network Slice Admission Control (NSAC), wherein the message includes information related to Radio Access Technology (RAT) of a User Equipment (UE), wherein the RAT is a target RAT for a handover of the UE.

supplementary note 7. A method of a Network Slice Admission Control Function (NSACF) apparatus comprising:

receiving a first message from an apparatus related to Session Management Function (SMF), wherein the first message includes information related to first Radio Access Technology (RAT) of a User Equipment (UE);

receiving a second message from an Access and Mobility Management Function (AMF) apparatus, wherein the second message includes second information related to second RAT of the UE, wherein the second RAT is a target RAT for a handover of the UE; and accepting a PDU Session related to the handover in a case where the number of PDU Sessions on the second RAT reaches to a predetermined threshold value and the first RAT is mapped to the second RAT.

supplementary note 8. A method of an Access and Mobility Management Function (AMF) apparatus comprising:

communicating with a Network Slice Admission Control Function (NSACF) apparatus; and sending a message to the NSACF apparatus for a Network Slice Admission Control (NSAC), wherein the message includes information related to Radio Access Technology (RAT) of a User Equipment (UE), wherein the RAT is a target RAT for a handover of the UE.

supplementary note 9. A method of a Network Slice Admission Control Function (NSACF) apparatus comprising:

receiving a first message from an apparatus related to Session Management Function (SMF), wherein the first message includes information related to first Radio Access Technology (RAT) of a User Equipment (UE);

receiving a second message from an Access and Mobility Management Function (AMF) apparatus, wherein the second message includes second information related to second RAT of the UE, wherein the second RAT is a target RAT for a handover of the UE; and accepting a PDU Session related to the handover in a case where the number of UEs on the second RAT reaches to a predetermined threshold value and the first RAT is mapped to the second RAT.

supplementary note 10. A Session Management Function (SMF) apparatus comprising:

means for communicating with a Network Slice Admission Control Function (NSACF) apparatus; and means for sending a message to the NSACF apparatus for a Network Slice Admission Control (NSAC), wherein the message includes information related to a handover from Evolved Packet System (EPS) to 5th Generation System (5GS) and information indicating the NSAC is not supported in the EPS.

supplementary note 11. A Network Slice Admission Control Function (NSACF) apparatus comprising:

means for receiving a message from a Session Management Function (SMF) apparatus, wherein the message includes first information related to a handover from Evolved Packet System (EPS) to 5th Generation System (5GS) and second information indicating a Network Slice Admission Control Function (NSAC) is not supported in the EPS; and means for accepting a PDU Session related to the handover in a case where the number of PDU Sessions on the 5GS reaches to a predetermined threshold value and the message includes the first information and the second information.

supplementary note 12. An Access and Mobility Management Function (AMF) apparatus comprising:

means for communicating with a Network Slice Admission Control Function (NSACF) apparatus; and means for sending a message to the NSACF apparatus for a Network Slice Admission Control (NSAC), wherein the message includes information related to a handover from Evolved Packet System (EPS) to 5th Generation System (5GS) and information indicating the NSAC is not supported in the EPS.

supplementary note 13. A Network Slice Admission Control Function (NSACF) apparatus comprising:

means for receiving a message from an Access and Mobility Management Function (AMF) apparatus, wherein the message includes first information related to a handover from Evolved Packet System (EPS) to 5th Generation System (5GS) and second information indicating a Network Slice Admission Control Function (NSAC) is not supported in the EPS; and means for accepting a registration of a User Equipment (UE) related to the handover in a case where the number of UEs registered on 5GS reaches to a predetermined threshold value and the message includes the first information and the second information.

supplementary note 14. An apparatus related to Session Management Function (SMF) comprising:

means for communicating with a Network Slice Admission Control Function (NSACF) apparatus; and means for sending a message to the NSACF apparatus for a Network Slice Admission Control (NSAC), wherein the message includes information related to Radio Access Technology (RAT) of a User Equipment (UE).

supplementary note 15. A Session Management Function (SMF) apparatus comprising:

means for communicating with a Network Slice Admission Control Function (NSACF) apparatus; and means for sending a message to the NSACF apparatus for a Network Slice Admission Control (NSAC), wherein the message includes information related to Radio Access Technology (RAT) of a User Equipment (UE), wherein the RAT is a target RAT for a handover of the UE.

supplementary note 16. A Network Slice Admission Control Function (NSACF) apparatus comprising:

means for receiving a first message from an apparatus related to Session Management Function (SMF), wherein the first message includes information related to first Radio Access Technology (RAT) of a User Equipment (UE);

means for receiving a second message from an Access and Mobility Management Function (AMF) apparatus, wherein the second message includes second information related to second RAT of the UE, wherein the second RAT is a target RAT for a handover of the UE; and means for accepting a PDU Session related to the handover in a case where the number of PDU Sessions on the second RAT reaches to a predetermined threshold value and the first RAT is mapped to the second RAT.

supplementary note 17. An Access and Mobility Management Function (AMF) apparatus comprising:

means for communicating with a Network Slice Admission Control Function (NSACF) apparatus; and means for sending a message to the NSACF apparatus for a Network Slice Admission Control (NSAC), wherein the message includes information related to Radio Access Technology (RAT) of a User Equipment (UE), wherein the RAT is a target RAT for a handover of the UE.

supplementary note 18. A Network Slice Admission Control Function (NSACF) apparatus comprising:

means for receiving a first message from an apparatus related to Session Management Function (SMF), wherein the first message includes information related to first Radio Access Technology (RAT) of a User Equipment (UE);

means for receiving a second message from an Access and Mobility Management Function (AMF) apparatus, wherein the second message includes second information related to second RAT of the UE, wherein the second RAT is a target RAT for a handover of the UE; and means for accepting a PDU Session related to the handover in a case where the number of UEs on the second RAT reaches to a predetermined threshold value and the first RAT is mapped to the second RAT.

supplementary note 19. A method of a first apparatus comprising:

communicating with a second apparatus; and sending, to the second apparatus, a first parameter indicating that a communication apparatus is changing communication system from a first communication system to a second communication system and a second parameter indicating that network slice control is supported or not supported.

supplementary note 20. A method of a second apparatus comprising:

receiving, from a first apparatus, a first parameter indicating that a communication apparatus is changing communication system from a first communication system to a second communication system and a second parameter indicating that network slice control is supported or not supported; and accepting a Protocol Data Unit (PDU) session(s) in a case where the second apparatus receives the first parameter and the second parameter.

supplementary note 21. A method of a third apparatus comprising:

communicating with a second apparatus; and sending, to the second apparatus, a first parameter indicating that a communication apparatus is changing communication system from a first communication system to a second communication system and a second parameter indicating that network slice control is supported or not or not supported.

supplementary note 22. A method of a second apparatus comprising:

receiving, from a first apparatus, a first parameter indicating that a communication apparatus is changing communication system from a first communication system to a second communication system and a second parameter indicating that network slice control is supported or not supported; and accepting a communication apparatus registration in a case where the second apparatus receives the first parameter and the second parameter.

supplementary note 23. A method of a second apparatus comprising:

receiving, from a first system, a third parameter indicating a first Radio Access Technology (RAT) type;

receiving, from a third apparatus, a fourth parameter indicating a second RAT type; and accepting Protocol Data Unit (PDU) session in a case where the second apparatus receives the third parameter and the fourth parameter.

supplementary note 24. The method according to supplementary note 23, wherein the second apparatus detecting a communication system changing of a communication apparatus from a first communication system to a second communication system based on the third parameter and the fourth parameter.

supplementary note 25. A method of a second apparatus comprising:

receiving, from a first system, a third parameter indicating a first Radio Access Technology (RAT) type;

receiving, from a third apparatus, a fourth parameter indicating a second RAT type; and accepting a communication apparatus registration in a case where the second apparatus receives the third parameter and the fourth parameter.

supplementary note 26. The method according to supplementary note 25, wherein the second apparatus detecting a communication system changing of a communication apparatus from a first communication system to a second communication system based on the third parameter and the fourth parameter.

supplementary note 27. A method according to supplementary note 19, supplementary note 20, or supplementary note 22, wherein the first apparatus is Session Management Function (SMF).

supplementary note 28. The method according to supplementary note 19, supplementary note 20, supplementary note 21, supplementary note 22, supplementary note 23, supplementary note 24, supplementary note 25 or supplementary note 26, wherein the second apparatus is Network Slice Admission Control Function (NSACF).

supplementary note 29. The method according to supplementary note 19, supplementary note 20, supplementary note 21, supplementary note 22, supplementary note 24, supplementary note 25 or supplementary note 26, wherein the communication apparatus is User Equipment (UE).

supplementary note 30. The method according to supplementary note 19, supplementary note 20, supplementary note 21, supplementary note 22, supplementary note 24, or supplementary note 26, wherein the first communication system is Evolved Packet System (EPS).

supplementary note 31. The method according to supplementary note 19, supplementary note 20, supplementary note 21, supplementary note 22, supplementary note 24, or supplementary note 26, wherein the second communication system is 5G System (5GS).

supplementary note 32. The method according to supplementary note 21, supplementary note 23 or supplementary note 25, wherein the third apparatus is Access and Mobility Management Function (AMF).

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Indian provisional patent application No. 202111028662, filed on Jun. 25, 2021, the disclosure of which is incorporated herein in its entirety by reference.

REFERENCE SIGNS LIST

1 USIM
3 UE
5 (R)AN node
7 core network
20 data network
31 transceiver circuit
32 antenna
33 controller
34 user interface
35 USIM
36 memory
51 transceiver circuit
52 antenna
53 network interface
54 controller
55 memory
60 RU
61 DU
62 CU
70 AMF
71 SMF
72 UPF
73 PCF
74 NEF
75 UDM
76 NWDAF
77 NSACF
361 operating system
362 communications control module
551 operating system
552 communications control module
601 transceiver circuit
602 antenna
603 network interface
604 controller
605 memory
611 transceiver circuit
612 network interface
613 controller
614 memory
621 transceiver circuit
622 network interface
623 controller
624 memory
701 transceiver circuit
702 network interface
703 controller
704 memory
711 transceiver circuit
712 network interface
713 controller
714 memory
751 transceiver circuit
752 network interface
753 controller
754 memory
771 transceiver circuit
772 network interface
773 controller
774 memory
3621 transceiver control module
5521 transceiver control module
6051 operating system
6052 communications control module
6141 operating system
6142 communications control module
6241 operating system
6242 communications control module
7041 operating system
7042 communications control module
7141 operating system
7142 communications control module
7541 operating system
7542 communications control module
7741 operating system
7742 communications control module
60521 transceiver control module
61421 transceiver control module
62421 transceiver control module
70421 transceiver control module
71421 transceiver control module
75421 transceiver control module
77421 transceiver control module

What is claimed is:

1. A method performed by a Network Slice Admission Control Function (NSACF), the method comprising:

receiving, from an Access and Mobility Management Function (AMF), a request including an identifier of a User Equipment (UE);

based on UE admission being above a threshold, checking a presence of an indication in the request, wherein the indication is related to the UE already being registered and mobility of the UE from an Evolved Packet System (EPS) to a 5G System (5GS); and based on the presence of the indication in the request, accepting the request.

2. The method according to claim 1, further comprising: updating a number of UE registered for a network slice in a case where the indication is present.

3. The method according to claim 1 or claim 2, wherein the threshold is a threshold level related to a maximum number of UE registered with a Single Network Slice Selection Assistance Information (S-NSSAI).

4. A Network Slice Admission Control Function (NSACF) comprising:

a memory storing instructions; and at least one processor configured to process the instructions to:

receive, from an Access and Mobility Management Function (AMF), a request including an identifier of a User Equipment (UE), based on UE admission being above a threshold, check a presence of an indication in the request, wherein the indication is related to the UE already being registered and mobility of the UE from an Evolved Packet System (EPS) to a 5G System (5GS), and based on the presence of the indication in the request, accept the request.

5. The NSACF according to claim 4, wherein the at least one processor is further configured to process the instructions to:

update of a number of UE registered for a network slice in a case where the indication is present.

6. The NSACF according to claim 4 or claim 5, wherein the threshold is a threshold level related to a maximum number of UE registered with a Single Network Slice Selection Assistance Information (S-NSSAI).

* * * * *